United States Patent
Shimizu et al.

(10) Patent No.: US 10,072,377 B2
(45) Date of Patent: Sep. 11, 2018

(54) PREPREG AND FIBER-REINFORCED COMPOSITE MATERIAL

(75) Inventors: Yuko Shimizu, Nagoya (JP); Nobuyuki Tomioka, Nagoya (JP); Shirou Honda, Nagoya (JP); Maki Nagano, Nagoya (JP); Yuji Echigo, Nagoya (JP); Hiroshi Takezaki, Nagoya (JP); Junko Kawasaki, Iyo-gun (JP); Hiroshi Taiko, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 682 days.

(21) Appl. No.: 14/234,996

(22) PCT Filed: Jul. 25, 2012

(86) PCT No.: PCT/JP2012/068782
§ 371 (c)(1),
(2), (4) Date: Jan. 24, 2014

(87) PCT Pub. No.: WO2013/015299
PCT Pub. Date: Jan. 31, 2013

(65) Prior Publication Data
US 2014/0162518 A1    Jun. 12, 2014

(30) Foreign Application Priority Data

Jul. 27, 2011   (JP) .................. 2011-163902
Jul. 27, 2011   (JP) .................. 2011-163903
Jul. 27, 2011   (JP) .................. 2011-163904

(51) Int. Cl.
*D06M 15/55*    (2006.01)
*C08J 5/24*    (2006.01)
(Continued)

(52) U.S. Cl.
CPC ............... *D06M 15/55* (2013.01); *B32B 5/02* (2013.01); *B32B 5/145* (2013.01); *B32B 5/16* (2013.01);
(Continued)

(58) Field of Classification Search
None
See application file for complete search history.

(56) References Cited

U.S. PATENT DOCUMENTS

| | | | |
|---|---|---|---|
| 6,117,551 | A | 9/2000 | Nagata et al. |
| 6,596,373 | B1 | 7/2003 | Kishi et al. |
| 2013/0281573 | A1 | 10/2013 | Goto et al. |

FOREIGN PATENT DOCUMENTS

| | | |
|---|---|---|
| JP | 3-26750 A | 2/1991 |
| JP | 3-192149 A | 8/1991 |

(Continued)

OTHER PUBLICATIONS

Kishi et al., Prepreg and Fiber-Reinforced Resin, Feb. 10, 1995, machine translation of JP07-041576.*

(Continued)

*Primary Examiner* — Chinessa T Golden
(74) *Attorney, Agent, or Firm* — Birch, Stewart, Kolasch & Birch LLP

(57) ABSTRACT

A fiber reinforced composite material having high interlaminar toughness and compressive strength under wet heat conditions, as well as an epoxy resin composition for production thereof and a prepreg producible from the epoxy resin composition is described. The prepreg includes at least constituents [A], [B], and [C] as specified below and reinforcement fiber, wherein 90% or more of constituent [C] exists in the depth range accounting for 20% of the prepreg (Continued)

thickness from the prepreg surface: [A] epoxy resin; [B] epoxy resin curing agent; and [C] polymer particles insoluble in epoxy resin.

12 Claims, 2 Drawing Sheets

(51) Int. Cl.
    *C08G 59/50*     (2006.01)
    *C08L 63/00*     (2006.01)
    *C08G 69/26*     (2006.01)
    *B32B 5/02*     (2006.01)
    *B32B 5/14*     (2006.01)
    *B32B 5/16*     (2006.01)
    *B32B 5/22*     (2006.01)
    *B32B 5/26*     (2006.01)
    *B32B 5/30*     (2006.01)

(52) U.S. Cl.
CPC ................. *B32B 5/22* (2013.01); *B32B 5/26* (2013.01); *B32B 5/30* (2013.01); *C08G 59/504* (2013.01); *C08G 59/5033* (2013.01); *C08G 69/26* (2013.01); *C08J 5/24* (2013.01); *C08L 63/00* (2013.01); *B32B 2260/02* (2013.01); *B32B 2260/025* (2013.01); *B32B 2260/046* (2013.01); *B32B 2262/106* (2013.01); *B32B 2264/0264* (2013.01); *B32B 2307/50* (2013.01); *B32B 2307/558* (2013.01); *B32B 2419/06* (2013.01); *B32B 2603/00* (2013.01); *B32B 2605/00* (2013.01); *B32B 2605/18* (2013.01); *C08J 2363/00* (2013.01); *Y10T 428/249945* (2015.04); *Y10T 442/2951* (2015.04)

(56) References Cited

FOREIGN PATENT DOCUMENTS

| | | | |
|---|---|---|---|
| JP | 7-41576 A | | 2/1995 |
| JP | 7-41577 A | | 2/1995 |
| JP | 07041576 A | * | 2/1995 |
| JP | 07041577 A | * | 2/1995 |
| JP | 2001-114915 A | | 4/2001 |
| JP | 2006-169541 A | | 6/2006 |
| JP | 2007-217665 A | | 8/2007 |
| JP | 2010-31198 A | | 2/2010 |
| JP | 2010031198 A | * | 2/2010 |
| JP | 2010-59225 A | | 3/2010 |
| JP | 2011162619 A | * | 8/2011 |
| WO | WO 2012/102201 A1 | | 8/2012 |

OTHER PUBLICATIONS

Sakata et al., Epoxy Resin Composition, Prepreg and Fiber Reinforced Composite Material, Aug. 25, 2011, machine translation of JP2011-162619.*
Kishi et al., Prepreg and Fiber-Reinforced Plastic, Feb. 10, 1995, machine translation of JP07-041577.*
Kato et al., Copolymerized Polyamide Fine Particle and Carbon Reinforced Composite Material, Feb. 12, 2010, machine translation of JP2010-031198.*
International Search Report issued in PCT/JP2012/068782 dated Oct. 23, 2012.

* cited by examiner

PREPREG AND FIBER-REINFORCED COMPOSITE MATERIAL

TECHNICAL FIELD

The present invention relates to a prepreg that serves to produce a fiber reinforced composite material having both high interlaminar toughness and high compressive strength under wet heat conditions, and also relates to a fiber reinforced composite material produced therefrom.

BACKGROUND ART

High in specific strength and specific rigidity, fiber reinforced composite materials, carbon fiber reinforced composite materials among others, are useful and have been used in a wide variety of applications including aircraft structure members, windmill blades, automobiles' exterior plates, and computer parts such as IC trays and notebook computer housing, and demands for them have been increasing every year.

A carbon fiber reinforced composite material has a non-uniform structure produced by molding a prepreg consisting essentially of carbon fiber, i.e., reinforcement fiber, and a matrix resin, and accordingly, such a structure has large differences in physical properties between the alignment direction of the reinforcement fiber and other directions. For instance, it is known that the interlaminar toughness, which represents the resistance to interlaminar fracture of the reinforcement fiber layers, cannot be improved drastically by simply increasing the strength of the reinforcement fiber. In particular, carbon fiber reinforced composite materials containing a thermosetting resin as matrix resin are generally liable to be fractured easily by a stress caused in a direction other than the alignment direction of the reinforcement fiber, reflecting the low toughness of the matrix resin. In this respect, various techniques have been proposed aiming to provide composite materials that have improved physical properties, including interlaminar toughness, to resist a stress in directions other than the alignment direction of the reinforcement fibers while maintaining high compressive strength in the fiber direction under high temperature and high humidity conditions, which is required for manufacturing aircraft structural members.

Furthermore, fiber reinforced composite materials have recently been applied to an increased range of aircraft structural members, and fiber reinforced composite materials are also in wider use for windmill blades and various turbines designed to achieving improved power generation efficiency and energy conversion efficiency. Studies have been made to provide thick members produced from prepreg sheets consisting of an increased number of layers as well as members having three-dimensionally curved surfaces. If such a thick member or curved-surfaced member suffers from a load, i.e., tensile or compression stress, the prepreg fiber layers may receive a peeling stress generated in an antiplane direction, which can cause opening-mode interlayer cracks. As these cracks expand, the overall strength and rigidity of the member can deteriorate, possibly leading to destruction of the entire member. Opening-mode, that is, mode I, interlaminar toughness is necessary to resist this stress.

In addition, the molding of a structural member of such a large size is liable to differences in heat history among different portions. Accordingly, it is also required for such a fiber reinforced composite material to maintain an undeteriorated shape and characteristics even if some fluctuations take place in the temperature-time profile during the molding process.

Compared to this, there is a proposal of a technique that uses high-toughness particle material of, for example, polyamide provided in regions between fiber layers so that the mode II interlaminar toughness will be increased to prevent damage to the surface that may be caused in falling weight impact test (see patent document 1). Even this technique, however, cannot serve adequately in the case of mode I interlaminar toughness.

Aside from this, another document has disclosed a material that contains a matrix resin composed of thermoplastic particles with a high melting point and thermoplastic particles with a low melting point and has high toughness against interlaminar fracture in addition to impact resistance (see patent document 2). However, it is difficult even for this technique to produce materials having both high mode I interlayer toughness and high compression strength in the fiber direction under moist heat conditions, and the resulting fiber reinforced composite materials suffer variations in interlayer morphology attributable to the melting and deformation of the interlayer particles depending on the molding conditions, failing to develop interlayer toughness stably. Furthermore, another document has disclosed a technique to use a combination of two types of particles with different glass transition temperatures (Tg) to produce a material having improved impact resistance and interlayer toughness while maintaining high heat resistance, and given some examples that use a combination of perfectly spherical polyamide particles with different Tg and particle diameters (see patent document 3). However, it is impossible even for this technique to develop interlayer toughness stably because the resulting fiber reinforced composite materials suffer variations in interlayer morphology attributable to the melting and deformation of the interlayer particles depending on the molding conditions.

PRIOR ART DOCUMENTS

Patent Documents

Patent document 1: U.S. Pat. No. 5,028,478 (specification)
Patent document 2: Published Japanese Translation of PCT International Publication JP 2010-525101
Patent document 3: Japanese Unexamined Patent Publication (Kokai) No. HEI 7-41576

SUMMARY OF THE INVENTION

Problems to be Solved by the Invention

An object of the present invention is to provide a prepreg that serves to produce a fiber reinforced composite material stably having interlaminar toughness while maintaining compressive strength under wet heat conditions, and to provide a fiber reinforced composite material produced therefrom.

Means of Solving the Problems

The present invention adopts one or more of the following constitutions to meet the above object. Specifically, the invention provides a prepreg including at least the following constituents [A], [B], and [C] and reinforcement fiber, wherein 90% or more of constituent [C] exists in the depth range accounting for 20% of the prepreg thickness from the prepreg surface:
[A] epoxy resin
[B] epoxy resin curing agent
[C] polymer particles insoluble in epoxy resin and falling under any of the following [Cx] to [Cz]
[Cx] polymer particles insoluble in epoxy resin and giving a particle diameter distribution chart meeting the following requirements from (x-i) to (x-iii)
(x-i) the chart has at least two peaks,
(x-ii) the particles giving the two highest peaks have a diameter ratio in the range of 1.5 to 7, and
(x-iii) of the two highest peaks, the one attributable to the larger-diameter particle has a half-value width in the range of 1.1 to 3,
[Cy] polymer particles insoluble in epoxy resin and meeting the following requirements from (y-i) to (y-iii):
(y-i) the average particle diameter is in the range of 1 to 18 μm,
(y-ii) the particle sphericity is in the range of 90 to 100, and
(y-iii) the glass transition temperature is in the range of 80 to 155° C.,
[Cz] polymer particles insoluble in epoxy resin and meeting the following requirements from (z-i) to (z-iii):
(z-i) the average particle diameter is more than 12 μm and 50 μm or less,
(z-ii) the particle sphericity is in the range of 90 to 100, and
(z-iii) the glass transition temperature is in the range of 80 to 155° C.

In a preferable embodiment of the prepreg according to the present invention, [Cx] represents polymer particles insoluble in epoxy resin further meeting the following requirement of (x-iv):
(x-iv) of the two highest peaks, the one attributable to the larger-diameter particles and the other attributable to the smaller-diameter particles have a height ratio in the range of 0.6 to 7.

According to a preferred embodiment of the prepreg of the present invention, particles [Cx] contain the following particles [Cx1] and [Cx2]:
[Cx1] polymer particles insoluble in epoxy resin and having a sphericity in the range of 90 to 100 and a particle diameter distribution index in the range of 1.0 to 1.8, and
[Cx2] polymer particles insoluble in epoxy resin and having an average particle diameter in the range of 1/10 to 2/3 of that of particles [Cx1].

According to a preferred embodiment of the prepreg of the present invention, the mass content of particles [Cx1] in particles [Cx] is in the range of 50 to 90 mass %.

According to a preferred embodiment of the prepreg of the present invention, particles [Cx1] are polymer particles having a glass transition temperature in the range of 80 to 180° C.

According to a preferred embodiment of the prepreg of the present invention, particles [Cx1] have an average particle diameter in the range of 5 to 30 μm.

According to a preferred embodiment of the prepreg of the present invention, particles [Cy] have a glass transition temperature in the range of 130 to 150° C.

According to a preferred embodiment of the prepreg of the present invention, particles [Cy] have a particle diameter distribution index in the range of 1.5 to 10.

According to a preferred embodiment of the prepreg of the present invention, particles [Cz] have a glass transition temperature in the range of 130 to 150° C.

According to a preferred embodiment of the prepreg of the present invention, particles [Cz] have a particle diameter distribution index in the range of 1.0 to 2.0.

According to a preferred embodiment of the prepreg of the present invention, particles [C] are polyamide particles.

According to a preferred embodiment of the prepreg of the present invention, particles [Cx1], [Cy], and [Cz] are polyamide particles containing a chemical structure as represented by general formula (1).

[Chemical formula 1]

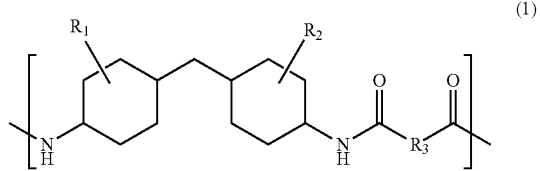

(1)

(In the formula, $R_1$ and $R_2$ represent a hydrogen atom, an alkyl group containing 1 to 8 carbon atoms, or a halogen atom, and may be either identical to or different from each other. In the formula, $R_3$ represents a methylene group containing 1 to 20 carbon atoms.)

According to a preferred embodiment of the prepreg of the present invention, the aforementioned epoxy resin [A] contains a polyfunctional amine type epoxy resin.

According to a preferred embodiment of the prepreg of the present invention, the aforementioned epoxy resin curing agent [B] is an aromatic amine, or more specifically, diaminodiphenyl sulfone, a derivative thereof, or an isomer thereof.

For the present invention, furthermore, a fiber reinforced composite material can be produced by curing the prepreg.

Advantageous Effect of the Invention

According to the present invention, it is possible to provide a fiber reinforced composite material having high interlaminar toughness and compressive strength under wet heat conditions, as well as an epoxy resin composition and a prepreg for fiber reinforced composite material production that serve for production thereof.

DESCRIPTION OF EMBODIMENTS

Figure 1:
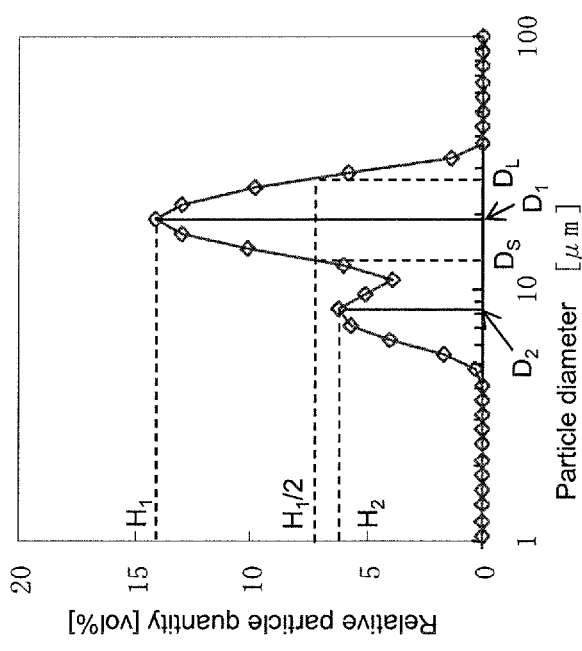
FIG. 1 is an exemplary particle diameter distribution chart.

The prepreg and fiber reinforced composite material according to the present invention are described in detail below.

Epoxy resin [A] designed for the present invention is a compound having a plurality of epoxy groups in one molecule.

Specific examples of epoxy resin [A] to be used for the present invention include aromatic glycidyl ethers produced from a phenol having a plurality of hydroxyl groups, aliphatic glycidyl ethers produced from an alcohol having a plurality of hydroxyl groups, glycidyl amines produced from an amine, glycidyl esters produced from a carboxylic acid having a plurality of carboxyl groups, and epoxy resins having an oxirane ring.

In particular, glycidyl amine type epoxy resins are preferred because they are low in viscosity and able to impregnate reinforcement fiber easily and accordingly can serve to produce fiber reinforced composite materials having good mechanical characteristics including heat resistance and elastic modulus. Such glycidyl amine type epoxy resins can be roughly divided into two groups: polyfunctional amine type epoxy resins and bifunctional amine type epoxy resins.

A polyfunctional amine type epoxy resin is an amine type epoxy containing three or more epoxy groups in one epoxy resin molecule. Such polyfunctional amine type epoxy resins include, for instance, tetraglycidyl diaminodiphenyl methane, triglycidyl aminophenol, tetraglycidyl xylylene diamine, and diglycidyl aniline, as well as halogen-substituted compounds, alkyl-substituted compounds, aralkyl-substituted compounds, allyl-substituted compounds, alkoxy-substituted compounds, aralkoxy-substituted compounds, allyloxy-substituted compounds, and hydrogenated compounds thereof.

There are no specific limitations on the polyfunctional amine type epoxy resin to be used, but preferred ones include tetraglycidyl diaminodiphenyl methane, triglycidyl aminophenol, tetraglycidyl xylylene diamine, and substituted or hydrogenated compounds thereof.

Useful tetraglycidyl diaminodiphenyl methane as described above include Sumiepoxy (registered trademark) ELM434 (supplied by Sumitomo Chemical Co., Ltd.), YH434L (supplied by Nippon Steel Chemical Co., Ltd.), jER (registered trademark) 604 (supplied by Mitsubishi Chemical Corporation), and Araldite (registered trademark) MY720 or MY721 (supplied by Huntsman Advanced Materials Gmbh). Useful triglycidyl aminophenols and alkyl-substituted compounds thereof include Sumiepoxy (registered trademark) ELM100 or ELM120 (supplied by Sumitomo Chemical Co., Ltd.), Araldite (registered trademark) MY0500, MY0510, or MY0600 (supplied by Huntsman Advanced Materials Gmbh), and jER (registered trademark) 630 (supplied by Mitsubishi Chemical Corporation). Useful tetraglycidyl xylylene diamines and hydrogenated compounds thereof include Tetrad (registered trademark)-X and Tetrad (registered trademark)-C (supplied by Mitsubishi Gas Chemical Co., Inc.)

Polyfunctional amine type epoxy resins are used preferably as epoxy resin [A] for the present invention because it can produce a cured resin with well-balanced mechanical characteristics including heat resistance and elastic modulus. It is preferable that such polyfunctional amine type epoxy resins account for 40 to 70 mass % of the total epoxy resin quantity.

Epoxy resin [A] to be used for the present invention may contain other components such as an epoxy resin that is not of a glycidyl amine type and a copolymer of an epoxy resin and a thermosetting resin. Examples of the aforementioned thermosetting resin to be copolymerized with an epoxy resin include, for instance, unsaturated polyester resin, vinyl ester resin, epoxy resin, benzoxazine resin, phenol resin, urea resin, melamine resin, and polyimide resin. These resin compositions and compounds may be used singly or in combination.

Preferred epoxy resins that can be used as a non-glycidyl amine type epoxy resin as described above include bifunctional epoxy resins such as glycidyl ether type epoxy resin produced from a phenol as precursor. Such epoxy resins include bisphenol A type epoxy resin, bisphenol F type epoxy resin, bisphenol S type epoxy resin, naphthalene type epoxy resin, biphenyl type epoxy resin, urethane modified epoxy resin, hydantoin type epoxy resin, and resorcinol type epoxy resin.

For the present invention, polymer particles [C] insoluble in epoxy resin are required to fall under any of the following particles [Cx] to [Cz]

[Cx] polymer particles insoluble in epoxy resin and giving a particle diameter distribution chart meeting the following requirements from (x-i) to (x-iii):
(x-i) the chart has at least two peaks,
(x-ii) the particles giving the two highest peaks have a diameter ratio in the range of 1.5 to 7,
(x-iii) the one of the two highest peaks attributable to the larger-diameter particles has a half-value width in the range of 1.1 to 3.

[Cy] polymer particles insoluble in epoxy resin and meeting the following requirements from (y-i) to (y-iii):
(y-i) the average particle diameter is in the range of 1 to 18 μm,
(y-ii) the particle sphericity is in the range of 90 to 100,
(y-iii) the glass transition temperature is in the range of 80 to 155° C.

[Cz] polymer particles insoluble in epoxy resin and meeting the following requirements from (z-i) to (z-iii):
(z-i) the average particle diameter is more than 12 μm and 50 μm or less,
(z-ii) the particle sphericity is in the range of 90 to 100,
(z-iii) the glass transition temperature is in the range of 80 to 155° C.

Here, the expression "being insoluble in epoxy resin" means that when an epoxy resin containing dispersed polymer particles are heat-cured, the polymer particles substantially do not dissolve in the epoxy resin, and that in observations by, for instance, transmission electron microscopy, particles in the cured epoxy resin do not undergo substantial shrinkage from their original size and have clearly defined interfaces with the matrix resin.

For the present invention, polymer particles [Cx] are required to give a particle diameter distribution chart containing at least two peaks. The particle diameter distribution chart referred to above is an ordinary type particle diameter distribution chart that is measured with a laser diffraction type particle size distribution analyzer based on the Mie scattering and diffraction theory and represented by the volume-based relative particle quantity and the particle diameter as the longitudinal axis and horizontal axis respectively. If three or more such peaks are contained, the two highest peaks are selected from all peaks.

It is also necessary that the two peaks have a particle diameter ratio in the range of 1.5 to 7, and it is preferably in the range of 2 to 5. Here, the particle diameter ratio of the two peaks means the ratio of D1/D2 between the diameter (D1) of the particles that give the peak attributable to the larger-diameter particles and the diameter (D2) of the particles that give the peak attributable to the smaller-diameter particles, as illustrated in FIG. 1. If the particle diameter ratio is in this range, the smaller particles fill the spaces among the larger particles in the fiber interlayer region to achieve close packing of the particles, thereby leading to a fiber reinforced composite material having improved impact resistance and interlayer toughness. If the particle diameter ratio is less than 1.5, large particle packing effect will not be achieved and the resulting fiber reinforced composite material will fail to have improved impact resistance or interlayer toughness. If the particle diameter ratio is more than 7, on the other hand, the smaller-diameter particles will be so small that they will enter into the fiber layer and fail to contribute to increasing the interlayer toughness, or the larger-diameter particles will be so large that the interlayer distance will be increased excessively to decrease the packing density of the particles in the interlayer region, also leading to a fiber reinforced composite material with inadequate impact resistance or interlayer toughness.

Furthermore, the peak attributable to the larger-diameter particles given by these particles [Cx] is required to have a half-value width in the range of 1.1 to 3. As illustrated in FIG. 1, the half-value width is determined by drawing a horizontal line at a height equal to a half of the height of the peak attributable to the larger-diameter particles and calculating the ratio of DL/DS between the particle diameter (DL) corresponding to the intersection of the line with the larger particle diameter part of the peak and the particle diameter (DS) corresponding to the intersection of the line with its smaller particle diameter part. If the half-value width of the peak is in the range of 1.1 to 3, the packing density of the particles in the interlayer region can be increased effectively, making it possible to produce a fiber reinforced composite material with improved impact resistance and interlayer toughness. If the half-value width of the peak is less than 1.1, precise classification will be necessary to achieve a very narrow particle diameter distribution, leading to problems associated with increased costs. If the half-value width of the peak is more than 3, on the other hand, the particle packing effect in the interlayer region will be poor and bulky particles will exist, possibly leading to the formation of streaks in the resin coating step that may have adverse influence on the prepreg production process.

For the present invention, polymer particles [Cx] insoluble in epoxy resin preferably gives a particle diameter distribution chart further meeting the following requirement of (x-iv).

(x-iv) the one of the two highest peaks attributable to the larger-diameter particles and the other attributable to the smaller-diameter particles have a height ratio in the range of 0.6 to 7.

Specifically, the height H1 of the peak attributable to the larger-diameter particles and the height H2 attributable to the smaller-diameter particles preferably meet the following relation:

$$0.6 < H1/H2 < 7$$

Furthermore, this peak height ratio is more preferably in the range of 1 to 5.

If the peak height ratio is in the range of 0.6 to 7, the packing density of the particles in the interlayer region can be increased effectively, making it possible to produce a fiber reinforced composite material with improved impact resistance and interlayer toughness. If the peak height ratio is less than 0.6, the content of smaller-diameter particles will be so large as to cause an increase in viscosity, leading to deterioration in the prepreg production process. If the peak height ratio is more than 7, on the other hand, the particle packing effect will be poor and the resulting fiber reinforced composite material will fail to have improved impact resistance or interlayer toughness.

For the present invention, polymer particles [Cx] preferably contain the following polymer particles [Cx1] and [Cx2]:

[Cx1] polymer particles insoluble in epoxy resin and having a sphericity in the range of 90 to 100 and a particle diameter distribution index in the range of 1.0 to 1.8, and

[Cx2] polymer particles insoluble in epoxy resin and having an average particle diameter in the range of 1/10 to 2/3 of that of polymer particles [Cx1].

For the present invention, polymer particles [Cx1] preferably have a sphericity of 90 to 100, more preferably 96 to 100. Such a high sphericity allows the epoxy resin composition containing these dispersed polymer particles to be low in viscosity, accordingly making it possible to increase the content of the polymer particles. When combined with particles [Cx2], furthermore, they serve to increase the particle packing density. If the sphericity is less than 90, the epoxy resin composition will have a high viscosity and this limits the content of the polymer particles, and furthermore, will fail to have significant particle packing effect when combined with particles [Cx2].

The sphericity is determined by observing the particles by scanning electronic microscopy, measuring their major and minor axes, and calculating the sphericity by the following numeric conversion equation from the average of measurements for randomly selected 30 particles.

$$\text{Sphericity} = \frac{\sum_{i=1}^{n}(\text{minor axis}/\text{major axis})}{n} \times 100 \quad \text{[Formula 1]}$$

Here, n denotes the number of measurements, which is equal to 30.

Polymer particles [Cx1] used for the present invention preferably have a particle diameter distribution index of 1.0 to 1.8, more preferably 1.1 to 1.5. If particles having a relatively narrow diameter distribution as above are combined with particles [Cx2], they will tend to have high particle packing effect in the interlayer region in a fiber reinforced composite material produced by stacking and heat-curing prepreg sheets composed of an epoxy resin composition containing these dispersed polymer particles combined with reinforcement fiber. They also tend to serve to produce a fiber reinforced composite material with a uniform interlayer thickness while preventing regions with an excessively large interlayer thickness from being formed as a result of the existence of some bulky particles. If particles with a diameter distribution index of more than 1.8 are combined with particles [Cx2], they will fail to serve effectively to improve the particle packing density in the interlayer region and tend to cause irregularity in the interlayer thickness, possibly leading to a material suffering from large variations in these characteristics.

The particle diameter distribution index can be calculated by the following numeric conversion equation using a particle diameter value determined by the method described later.

$$Dn = \sum_{i=1}^{n} Ri/n \quad \text{[Formula 2]}$$

$$Dv = \sum_{i=1}^{n} Ri^4 \Big/ \sum_{i=1}^{n} Ri^3$$

$$PDI = Dv/Dn$$

Here, Ri, n, Dn, Dv, and PDI denote the particle diameter of each particular particle, number of measurements (100), number average particle diameter, volume average particle diameter, and particle diameter distribution index, respectively.

In addition, the mass content of polymer particles [Cx1] in polymer particles [Cx] used for the present invention is preferably in the range of 50 to 90 mass %. If the mass content of polymer particles [Cx1] is in this range, the particle packing density in the interlayer region can be increased effectively while minimizing the increase in the viscosity of the resin composition. If the mass content is less than 50 mass %, the content of smaller-diameter particles will be so large as to cause an increase in viscosity, leading to deterioration in the prepreg production process. If the mass content is more than 90 mass %, on the other hand, the particle packing effect will be small and the resulting fiber reinforced composite material will fail to have improved impact resistance or interlayer toughness.

For the present invention, furthermore, polymer particles [Cx1] preferably have a glass transition temperature in the range of 80 to 180° C., more preferably in the range of 100 to 160° C., still more preferably in the range of 130 to 155° C., and most preferably in the range of 130 to 150° C. Such a relatively high glass transition temperature ensures that the polymer particles will not suffer from deformation during heat-curing and that a stable interlayer thickness will be achieved, making it possible to obtain a fiber reinforced composite material that has high interlaminar toughness and maintains a compressive strength stably under wet heat conditions. If the glass transition temperature is less than 80° C., the resulting fiber reinforced composite material will fail to have a well-balanced combination of an interlaminar toughness and a compressive strength under wet heat conditions. If the glass transition temperature is more than 180° C., on the other hand, the polymer particles themselves will tend to be low in toughness and sufficient interface adhesion will not be achieved between the polymer particles and the matrix resin, resulting in a fiber reinforced composite material with insufficient interlaminar toughness.

The glass transition temperature of polymer particles [Cx1] is determined by performing differential scanning calorimetry (DSC) as follows: a specimen is heated at a heating rate of 20° C./min from 30° C. to a temperature 30° C. or more higher than an expected glass transition temperature, maintained at the temperature for 1 min, once cooled at a cooling rate of 20° C./min down to 0° C., maintained at the temperature for 1 min, and then heated again at a heating rate of 20° C./min while observing the glass transition temperature (Tg).

Polymer particles [Cx1] used for the present invention preferably have an average particle diameter in the range of 5 to 30 μm, more preferably in the range of 8 to 20 μm. The average particle diameter as referred to herein is the number average particle diameter. An average particle diameter in this range ensures that when prepreg sheets produced by combining reinforcement fibers with an epoxy resin composition containing dispersed polymer particles are stacked and heat-cured to form a fiber reinforced composite material, the polymer particles will not penetrate into the reinforcement fiber layers or regions with an excessive interlayer thickness will not result from the existence of some bulky particles, leading to a fiber reinforced composite material with a uniform interlayer thickness. Accordingly, this ensures a stably high interlaminar toughness.

There are no specific limitations on the resin species to be used as polymer particles [Cx1] for the present invention,
and it may be either a thermoplastic resin or thermosetting resin having a glass transition temperature in the range of 80° C. to 180° C.

Specifically, usable thermoplastic resins include vinyl polymer, polyester, polyamide, polyarylene ether, polyarylene sulfide, polyethersulfone, polysulfone, polyether ketone, polyether ether ketone, polyurethane, polycarbonate, polyamide-imide, polyimide, polyetherimide, polyacetal, silicone, and copolymers thereof.

Specifically, usable thermosetting resins include epoxy resin, benzoxazine resin, vinyl ester resin, unsaturated polyester resin, urethane resin, phenol resin, melamine resin, maleimide resin, cyanate ester resin, and urea resin.

The resins given above can be used singly or in combination.

Of these, polyamide, which is a thermoplastic resin, is preferred because of its high elongation percentage, toughness, and adhesiveness with matrix resins. Examples of polyamide include polyamide compounds that can be produced through condensation polymerization of lactams having a 3- or more-membered ring, polymerizable aminocarboxylic acids, dibasic acids, diamines, salts thereof, or mixtures thereof.

Specifically, they include polyhexamethylene terephthalamide (nylon 6T), polynonane terephthalamide (nylon 9T), poly-m-xylene adipamide (nylon MXD), copolymers of 3,3'-dimethyl-4,4'-diaminodicyclohexyl methane, isophthalic acid, and 12-aminododecanoic acid (for instance, Grilamid (registered trademark) TR55, supplied by Emser Werke, Inc.), copolymers of 3,3'-dimethyl-4,4'-diaminodicyclohexyl methane and dodeca diacid (for instance, Grilamid (registered trademark) TR90, supplied by Emser Werke, Inc.), and a copolymer of 4,4'-diaminodicyclohexyl methane and dodeca diacid (for instance, Trogamid (registered trademark) CX7323, supplied by Degussa AG).

In particular, polymer particles [Cx1] used for the present invention are preferably of a polyamide compound having a chemical structure as represented by general formula (I) because when processed into a fiber reinforced composite material, they can provide a fiber reinforced composite material having a high wet heat resistance and solvent resistance as well as a high impact resistance and interlaminar toughness.

[Chemical formula 2]

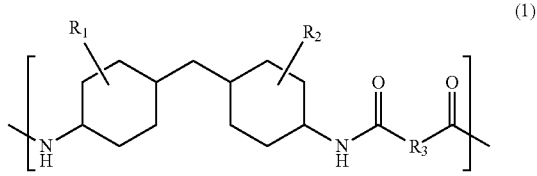

(1)

(In the formula, $R_1$ and $R_2$ represent a hydrogen atom, an alkyl group containing 1 to 8 carbon atoms, or a halogen atom, and may be either identical to or different from each other. In the formula, $R_3$ represents a methylene group containing 1 to 20 carbon atoms.)

Such polyamide compounds include copolymers of 3,3'-dimethyl-4,4'-diaminodicyclohexyl methane and dodeca diacid (for instance, Grilamid (registered trademark) TR90, supplied by Emser Werke, Inc.), mixtures of a copolymer of 3,3'-dimethyl-4,4'-diaminodicyclohexyl methane, isophthalic acid, and 12-aminododecanoic acid, with a copolymer of 3,3'-dimethyl-4,4'-diaminodicyclohexyl methane and dodeca diacid (for instance, Grilamid (registered trademark) TR70LX, supplied by Emser Werke, Inc., copolymers of 4,4'-diaminodicyclohexyl methane and dodeca diacid (for instance, Trogamid (registered trademark) CX7323, supplied by Degussa AG).

For the present invention, polymer particles [Cx2] preferably have an average particle diameter in the range of 1/10 to 2/3 of that of polymer particles [Cx1]. If the average particle diameter is in this range, particles [Cx2] fill the spaces among particles [Cx1] in the fiber interlayer region to achieve close packing of the particles, thereby leading to a fiber reinforced composite material having improved impact resistance and interlayer toughness. If the average particle diameter is more than 2/3 of that of particles [Cx1], the particle packing effect will be small and the resulting fiber reinforced composite material will fail to have improved impact resistance or interlayer toughness. If the average particle diameter is less than 1/10 of that of particles [Cx1], the smaller-diameter particles will be so small that they will enter into the fiber layer and fail to contribute to increasing the interlayer toughness, or the larger-diameter particles will be so large that the interlayer distance will be increased excessively to decrease the packing density of the particles in the interlayer region, also leading to a fiber reinforced composite material with inadequate impact resistance or interlayer toughness.

For the present invention, there are no specific limitations on the polymer species of polymer particles [Cx2], and it may be identical to or different from that of particles [Cx1].

For the present invention, furthermore, polymer particles [Cx2] are preferably of a thermoplastic resin or thermosetting resin having a glass transition temperature in the range of 50° C. to 180° C.

For the present invention, polymer particles [Cy] preferably have an average particle diameter in the range of 1 to 18 μm, more preferably in the range of 4 to 15 μm, and still more preferably in the range of 4 to 12 μm. The average particle diameter as referred to herein is the number average particle diameter. An average particle diameter in this range ensures that when prepreg sheets produced by combining reinforcement fibers with an epoxy resin composition containing dispersed polymer particles are stacked and heat-cured to form a fiber reinforced composite material, the polymer particles will not penetrate into the reinforcement fiber layers or regions with an excessive interlayer thickness will not result from the existence of some bulky particles, leading to a fiber reinforced composite material with a uniform interlayer thickness. Accordingly, this ensures a stably high interlaminar toughness.

Polymer particles [Cy] used for the present invention preferably have a particle diameter distribution index of 1.5 to 10, more preferably 1.8 to 5. If particles having a relatively broad diameter distribution are used, they will tend to serve to increase the particle packing density effectively in the interlayer region in a fiber reinforced composite material produced by stacking and heat-curing prepreg sheets composed of an epoxy resin composition containing these dispersed polymer particles combined with reinforcement fiber. They also tend to serve to produce a fiber reinforced composite material with a uniform interlayer thickness while preventing regions with an excessively large interlayer thickness from being formed as a result of the existence of some bulky particles. If the particle diameter distribution index is less than 1.5, it will tend to be difficult to increase the particle packing density in the interlayer region. If it is more than 10, on the other hand, irregularity in the interlayer thickness will be caused easily, possibly leading to a material suffering from large variations in these characteristics.

The particle diameter distribution index can be calculated by the following numeric conversion equation using a particle diameter value determined by the method described later.

$$Dn = \sum_{i=1}^{n} Ri/n \quad \text{[Formula 3]}$$

$$Dv = \sum_{i=1}^{n} Ri^4 \bigg/ \sum_{i=1}^{n} Ri^3$$

$$PDI = Dv/Dn$$

Here, Ri, n, Dn, Dv, and PDI denote the particle diameter of a particular particle, number of measurements (100), number average particle diameter, volume average particle diameter, and particle diameter distribution index, respectively.

For the present invention, polymer particles [Cy] are required to have a sphericity of 90 to 100, and it is preferably 96 to 100. Such a high sphericity allows the epoxy resin composition containing these dispersed polymer particles to be low in viscosity, accordingly making it possible to increase the content of the polymer particles and also increase the particle packing density. If the sphericity is less than 90, the epoxy resin composition will have a high viscosity and this limits the content of the polymer particles and significant particle packing effect will not be achieved.

The sphericity is determined by observing particles by scanning electronic microscopy, measuring their major and minor axes, and calculating the sphericity by the following numeric conversion equation from the average of measurements for randomly selected 30 particles.

$$\text{Sphericity} = \frac{\sum_{i=1}^{n} (\text{minor axis}/\text{major axis})}{n} \times 100 \quad \text{[Formula 4]}$$

Here, n denotes the number of measurements, which is equal to 30.

For the present invention, polymer particles [Cz] are required to have an average particle diameter more than 12 μm and 50 μm or less, and it is preferably less than 18 μm and 30 μm or less, more preferably less than 18 μm and 25 μm or less. The average particle diameter as referred to herein is the number average particle diameter. If the average particle diameter is in this range, the region between the fiber layers that contains polymer particles [Cz] will have a sufficiently large thickness while preventing the formation of voids in the fiber layers from being caused by an excessively large interlayer thickness, thereby making it possible to produce a fiber reinforced composite material with high quality and resulting in a stably high mode II interlayer toughness.

Polymer particles [Cz] used for the present invention preferably have a particle diameter distribution index of 1.0 to 2.0, more preferably 1.0 to 1.6. If particles having a relatively narrow diameter distribution are used, they will tend to work to maintain a low particle packing density in the interlayer region in a fiber reinforced composite material produced by stacking and heat-curing prepreg sheets composed of an epoxy resin composition containing these dispersed polymer particles combined with reinforcement fiber, making it possible to produce a fiber reinforced composite material having a stably large interlayer thickness. If the particle diameter distribution index is more than 2.0, the particle packing density in the interlayer region tends to improve and accordingly the interlayer thickness will be relatively low, commonly leading to a fiber reinforced composite material with a small mode II interlayer toughness.

The particle diameter distribution index can be calculated by the following numeric conversion equation using a particle diameter value determined by the method described later.

$$Dn = \sum_{i=1}^{n} Ri/n \qquad \text{[Formula 5]}$$

$$Dv = \sum_{i=1}^{n} Ri^4 \bigg/ \sum_{i=1}^{n} Ri^3$$

$$PDI = Dv/Dn$$

Here, Ri, n, Dn, Dv, and PDI denote the particle diameter of each particular particle, number of measurements (100), number average particle diameter, volume average particle diameter, and particle diameter distribution index, respectively.

For the present invention, polymer particles [Cz] are required to have a sphericity of 90 to 100, and it is preferably 96 to 100. Such a high sphericity allows the epoxy resin composition containing these dispersed polymer particles to be low in viscosity, accordingly making it possible to increase the content of the polymer particles and also increase the particle packing density. If the sphericity is less than 90, the epoxy resin composition will have a high viscosity and this limits the content of the polymer particles and the region between the fiber layers will be small in thickness.

The sphericity is determined by observing particles by scanning electronic microscopy, measuring their major and minor axes, and calculating the sphericity by the following numeric conversion equation from the average of measurements for randomly selected 30 particles.

$$\text{Sphericity} = \frac{\sum_{i=1}^{n}(\text{minor axis/major axis})}{n} \times 100 \qquad \text{[Formula 6]}$$

Here, n denotes the number of measurements, which is equal to 30.

Polymer particles [Cy] and [Cz] used for the present invention are required to have a glass transition temperature in the range of 80 to 155° C., and it is preferably in the range of 130 to 155° C. and more preferably in the range of 130 to 150° C. Such a relatively high glass transition temperature ensures that polymer particles will not suffer from deformation during heat-curing and that a stable interlayer thickness will be achieved, making it possible to obtain a fiber reinforced composite material that has high interlaminar toughness and maintains a compressive strength stably under wet heat conditions. If the glass transition temperature is less than 80° C., the resulting fiber reinforced composite material will fail to have a well-balanced combination of an interlaminar toughness and a compressive strength under wet heat conditions. If the glass transition temperature is more than 155° C., on the other hand, the polymer particles themselves will tend to be low in toughness and sufficient interface adhesion will not be achieved between the polymer particles and the matrix resin, resulting in a fiber reinforced composite material with insufficient interlaminar toughness.

The glass transition temperature of polymer particles [Cy] and [Cz] is determined by performing differential scanning calorimetry (DSC) as follows: a specimen is heated at a heating rate of 20° C./min from 30° C. to a temperature 30° C. or more higher than an expected glass transition temperature, maintained at the temperature for 1 min, once cooled at a cooling rate of 20° C./min down to 0° C., maintained at the temperature for 1 min, and then heated again at a heating rate of 20° C./min while observing the glass transition temperature (Tg).

There are no specific limitations on the resin species used as polymer particles [Cy] and [Cz] for the present invention, and it may be either a thermoplastic resin or thermosetting resin having a glass transition temperature in the range of 80 to 155° C.

Specifically, usable thermoplastic resins include vinyl polymer, polyester, polyamide, polyarylene ether, polyarylene sulfide, polyethersulfone, polysulfone, polyether ketone, polyether ether ketone, polyurethane, polycarbonate, polyamide-imide, polyimide, polyetherimide, polyacetal, silicone, and copolymers thereof.

Specifically, usable thermosetting resins include epoxy resin, benzoxazine resin, vinyl ester resin, unsaturated polyester resin, urethane resin, phenol resin, melamine resin, maleimide resin, cyanate ester resin, and urea resin.

The resins given above can be used singly or in combination.

Of these, polyamide, which is a thermoplastic resin, is preferred because of its high elongation percentage, toughness, and adhesiveness with matrix resins. Examples of polyamide include polyamide compounds that can be produced through condensation polymerization of lactams having a 3- or more-membered ring, polymerizable aminocarboxylic acids, dibasic acids, diamines, salts thereof, or mixtures thereof.

Such polyamide compounds include polyhexamethylene terephthalamide (nylon 6T), polynonane terephthalamide (nylon 9T), poly-m-xylene adipamide (nylon MXD), copolymers of 3,3'-dimethyl-4,4'-diaminodicyclohexyl methane and dodeca diacid (for instance, Grilamid (registered trademark) TR90, supplied by Emser Werke, Inc.), and copolymers of 4,4'-diaminodicyclohexyl methane and dodeca diacid (for instance, Trogamid (registered trademark) CX7323, supplied by Degussa AG).

In particular, polymer particles [Cy] and [Cz] used for the present invention are each preferably of a polyamide compound having a chemical structure as represented by general formula (I) because when processed into a fiber reinforced composite material, they can provide a fiber reinforced composite material having a high wet heat resistance and solvent resistance as well as a high impact resistance and interlaminar toughness.

[Chemical formula 3]

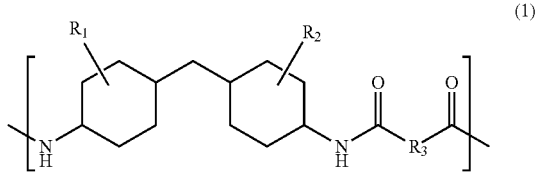

(In the formula, $R_1$ and $R_2$ represent a hydrogen atom, an alkyl group containing 1 to 8 carbon atoms, or a halogen atom, and may be either identical to or different from each other. In the formula, $R_3$ represents a methylene group containing 1 to 20 carbon atoms.)

Such polyamide compounds include copolymers of 3,3'-dimethyl-4,4'-diaminodicyclohexyl methane and dodeca diacid (for instance, Grilamid (registered trademark) TR90, supplied by Emser Werke, Inc.), mixtures of a copolymer of 3,3'-dimethyl-4,4'-diaminodicyclohexyl methane, isophthalic acid, and 12-aminododecanoic acid, with a copolymer of 3,3'-dimethyl-4,4'-diaminodicyclohexyl methane and dodeca diacid (for instance, Grilamid (registered trademark) TR70LX, supplied by Emser Werke, Inc., copolymers of 4,4'-diaminodicyclohexyl methane and dodeca diacid (for instance, Trogamid (registered trademark) CX7323, supplied by Degussa AG).

The prepreg according to the present invention is used in combination with an epoxy resin curing agent [B]. A curing agent as described herein is a curing agent suitable for the epoxy resin contained in the epoxy resin composition according to the present invention, and it is a compound having an active group that can react with the epoxy group. Specifically, examples of the curing agent include, for instance dicyandiamide, aromatic polyamine, aminobenzoic acid ester, various acid anhydrides, phenol novolac resin, cresol novolac resin, polyphenol compounds, imidazole derivatives, aliphatic amines, tetramethyl guanidine, thiourea-added amine, methylhexahydrophthalic anhydride, other carboxylic anhydrides, carboxylic acid hydrazide, carboxylic acid amide, polymercaptan, boron trifluoride—ethylamine complex, and other Lewis acid complexes.

The use of aromatic polyamine as the curing agent makes it possible to produce a cured epoxy resin with high heat resistance. In particular, of the various aromatic polyamine compounds, diaminodiphenyl sulfone, derivatives thereof, and various isomers thereof are the most suitable curing agents to produce a cured epoxy resin with a high heat resistance.

Furthermore, if a combination of dicyandiamide and a urea compound such as 3,4-dichlorophenyl-1,1-dimethylurea, or an imidazole is used as the curing agent, a high heat resistance and water resistance can be achieved even when curing is performed at a relatively low temperature. The use of an acid anhydride to cure an epoxy resin provides a cured material that has a lower water absorption percentage compared to curing with an amine compound. Other good curing agents include the above ones in latent forms such as microencapsulated ones, which serve to provide prepregs with high storage stability that will not suffer from significant changes particularly in tackiness and drape property even if left to stand at room temperature.

The optimum content of a curing agent depends on the type of epoxy resin and curing agent used. In the case of an aromatic amine curing agent, for instance, it is preferable to add it so that it will be stoichiometrically equivalent. However, a resin with a higher elastic modulus compared to the case of equivalency may be obtained when using an epoxy resin and an aromatic amine curing agent in such a manner that the ratio of the quantity of active hydrogen in the latter to the quantity of the epoxy group in the former is about 0.7 to 0.9, and this is also a preferable embodiment. These curing agents may be used singly, or a plurality thereof may be used in combination.

Commercial products of aromatic polyamine curing agents include Seikacure S (supplied by Wakayama Seika Kogyo Co., Ltd.), MDA-220 (supplied by Mitsui Chemicals, Inc.), jER Cure (registered trademark) W (supplied by Mitsubishi Chemical Corporation), 3,3'-DAS (supplied by Mitsui Chemicals, Inc.), Lonzacure (registered trademark) M-DEA (supplied by Lonza), Lonzacure (registered trademark) M-DIPA (supplied by Lonza), Lonzacure (registered trademark) M-MIPA (supplied by Lonza), and Lonzacure (registered trademark) DETDA 80 (supplied by Lonza).

A composition to be used may contain these epoxy resins and curing agents, part of which may be subjected to preliminary reaction in advance. In some cases, this method can serve effectively for viscosity adjustment and storage stability improvement.

The prepreg according to the present invention may contain a coupling agent, thermosetting resin particles other than [C], thermoplastic resin soluble in epoxy resins, or inorganic fillers such as silica gel, carbon black, clay, carbon nanotube, and metal powder, unless they impair the advantageous effect of the invention.

The prepreg according to the present invention is produced by impregnating reinforcement fiber with an epoxy resin composition for fiber reinforced composite material production as described above. Reinforcement fibers that can be used for the prepreg according to the present invention include carbon fiber, glass fiber, aramid fiber, boron fiber, PBO fiber, high-strength polyethylene fiber, alumina fiber, and silicon carbide fiber. A plurality of these fibers may be used as a mixture. There are no specific limitations on the form and way of alignment of the reinforcement fibers, and useful fiber structures include, for instance, long fibers paralleled in one direction, single tow, woven fabric, knit fabric, nonwoven fabric, mat, and braid.

With a high specific modulus and specific strength, carbon fiber can be used effectively, particularly when it is necessary to produce lightweight or high-strength materials.

With respect to carbon fiber used favorably for the present invention, virtually any appropriate type of carbon fiber can be adopted for specific uses, but it is preferable that the carbon fiber to be used has a tensile modulus not more than 400 GPa from the viewpoint of interlaminar toughness and impact resistance. From the viewpoint of strength, carbon fiber with a tensile strength of 4.4 to 6.5 GPa is used preferably because a composite material with high rigidity and mechanical strength can be produced. Tensile elongation is also an important factor, and it is preferable that the carbon fiber have a high strength and a high elongation percentage of 1.7 to 2.3%. The most suitable carbon fiber will simultaneously exhibit various characteristics including a tensile modulus of at least 230 GPa, tensile strength of at least 4.4 GPa, and tensile elongation of at least 1.7%.

Commercial products of carbon fibers include Torayca (registered trademark) T800G-24K, Torayca (registered trademark) T800S-24K, Torayca (registered trademark) T700G-24K, Torayca (registered trademark) T300-3K, and Torayca (registered trademark) T700S-12K (all supplied by Toray Industries, Inc.).

With respect to the form and way of alignment of carbon fibers, long fibers paralleled in one direction, woven fabric, or others may be selected appropriately, but if a carbon fiber reinforced composite material that is lightweight and relatively highly durable is to be obtained, it is preferable to use carbon fibers in the form of long fibers (fiber bundles) paralleled in one direction, woven fabric, or other continuous fibers.

Carbon fiber bundles to be used for the present invention preferably have a monofilament fineness of 0.2 to 2.0 dtex, more preferably 0.4 to 1.8 dtex. If the monofilament fineness is less than 0.2 dtex, carbon fiber bundles may be damaged easily due to contact with guide rollers during twining, and similar damage may take place during an impregnation step for the resin composition. If the monofilament fineness is more than 2.0 dtex, the resin composition may fail to impregnate carbon fiber bundles sufficiently, possibly resulting in a decrease in fatigue resistance.

The carbon fiber bundles to be used for the present invention preferably contain 2,500 to 50,000 filaments per fiber bundle. If the number of filaments is less than 2,500, the fibers may be easily caused to meander, leading to a decrease in strength. If the number of filaments is more than 50,000, resin impregnation may be difficult during prepreg preparation or during molding. The number of filaments is more preferably in the range of 2,800 to 40,000.

It is preferable that the prepreg according to the present invention be in the form of carbon fiber impregnated with an epoxy resin composition for fiber reinforced composite material production, and the mass fraction of the carbon fiber in the prepreg is preferably 40 to 90 mass %, more preferably 50 to 80 mass %. If the mass fraction of the carbon fiber is too small, the resulting composite material will be too heavy and the advantage of the fiber reinforced composite material having high specific strength and specific modulus will be impaired in some cases, while if the mass fraction of carbon fiber is too large, impregnation with the resin composition will not be achieved sufficiently and the resulting composite material will suffer from many voids, possibly leading to large deterioration in mechanical characteristics.

The prepreg according to the present invention preferably has a structure in which a particle-rich layer, that is, a layer in which localized existence of the aforementioned polymer particles [C] is clearly confirmed in observed cross sections (hereinafter, occasionally referred to as particle layer), is formed near the surface of the prepreg.

If a fiber reinforced composite material is produced by stacking prepreg sheets and curing the epoxy resin, this structure allows resin layers to be formed easily between prepreg layers, i.e., reinforcement fiber layers. Accordingly, strong adhesion and contact will be achieved between the reinforcement fiber layers and the resulting carbon fiber reinforced composite material will have high-level interlaminar toughness and impact resistance.

From this viewpoint, the aforementioned particle layer preferably exists in the depth range of 20%, more preferably 10%, of the total thickness (100%) of the prepreg, measured from the surface of the prepreg in the thickness direction. Furthermore, the particle layer may exist only at one side, but cautions are necessary because the prepreg will have two different sides. If interlayer regions containing particles and those free of particles coexist as a result of stacking of prepreg sheets in an inappropriate way by mistake, the resulting composite material will have poor interlaminar toughness. It is preferable that particle layers exist at both sides of the prepreg for allowing the prepreg to have two identical sides and making the stacking operation easy.

Furthermore, the proportion of the thermoplastic resin particles existing in the particle layers is preferably 90 to 100 mass %, more preferably 95 to 100 mass %, of the total quantity, or 100 mass %, of the thermoplastic resin particles existing in the prepreg.

This proportion of existing particles can be evaluated by, for instance, the undermentioned method. Specifically, a prepreg is interposed between two polytetrafluoroethylene resin plates having smooth surfaces and brought into close contact with them, and then the temperature is increased gradually for 7 days up to a curing temperature to ensure gelation and curing, thus producing a cured prepreg plate. In each face of the prepreg plate, a line parallel to the surface of the prepreg plate is drawn at a depth equal to 20% of the thickness. Then, the total area of the particles existing between each surface of the prepreg and each of the lines drawn above and the total area of the particles existing across the entire thickness of the prepreg are determined, followed by calculating the proportion of the area of the particles existing in the regions of 20% depth from the prepreg surfaces to the total area of the particles existing across the entire (100%) thickness of the prepreg. Here, the total area of the particles is determined by cutting the particle portions out of a cross-sectional photograph and converting their mass. When it is found difficult to distinguish particles dispersed in the resin in the photograph, the particles may be dyed and rephotographed.

The prepreg according to the present invention can be produced by applying methods as disclosed in Japanese Unexamined patent Publication (Kokai) No. HEI-1-26651, Japanese Unexamined patent Publication (Kokai) No. SHO-63-170427, or Japanese Unexamined patent Publication (Kokai) No. SHO-63-170428. Specifically, the prepreg according to the present invention can be produced by a method in which the surface of a primary prepreg consisting of reinforcement fiber, such as carbon fiber, and an epoxy resin, i.e., matrix resin, is coated with polymer particles that are simply in the form of particles; a method in which a mixture of these particles dispersed uniformly in an epoxy resin, i.e., matrix resin, is prepared and used to impregnate reinforcement fiber, and during this impregnation process, the reinforcement fiber works to prevent the penetration of these particles to allow the particles to be localized near the surface of the prepreg; and a method in which a primary prepreg is prepared in advance by impregnating reinforcement fiber with an epoxy resin, and a thermosetting resin film containing these particles at a high concentration is bonded to the surfaces of the primary prepreg. The uniform existence of polymer particles in the region accounting for 20% of the thickness of the prepreg serves to produce a prepreg for fiber composite material production having high interlaminar toughness.

The prepreg according to the present invention can be produced favorably by some different methods including a wet method in which the epoxy resin composition according to the present invention is dissolved in a solvent such as methyl ethyl ketone and methanol to produce a solution with a decreased viscosity, and then used to impregnate reinforcement fiber, and a hot melt method in which the epoxy resin composition is heated to decrease its viscosity and then used to impregnate reinforcement fiber.

In the wet method, the reinforcement fiber is immersed in a solution of the epoxy resin composition and then pulled out, and the solvent is evaporated using a tool such as oven to provide a prepreg.

In the hot melt method, an epoxy resin composition, with its viscosity decreased by heating, is used directly to impregnate reinforcement fiber. Alternatively, resin films are prepared by coating release paper or the like with an epoxy resin composition and the resin films are used to cover either or both sides of reinforcement fiber sheets and pressed under heat so that the epoxy resin composition is transferred to them for impregnation, thereby producing a prepreg. This hot melt method is preferred because substantially no solvent will remain in the prepreg.

The fiber reinforced composite material according to the present invention can be produced by, for instance, stacking a plurality of prepreg sheets prepared by a method as described above and heat and pressure are applied to the resulting layered body to heat-cure the epoxy resin.

The application of heat and pressure is carried out by using an appropriate method such as press molding, autoclave molding, bagging molding, wrapping tape molding, and internal pressure molding. In particular, wrapping tape molding and internal pressure molding have been preferred for production of molded sports goods.

In the wrapping tape molding method, a core bar such as mandrel is wound with a prepreg to produce a tube of fiber reinforced composite material, and this method is suitable for manufacturing rod-like products including golf club shaft and fishing rod. More specifically, a mandrel is wound with a prepreg and further wound with a wrapping tape of thermoplastic resin film to cover the prepreg so that the prepreg is secured and pressed, followed by heating and curing the epoxy resin in an oven and removing the core bar to provide a tubular material.

In the internal pressure molding method, a preform formed of an internal pressure-applying body such as a tube of thermoplastic resin wound with a prepreg is fixed in a mold, and high pressure gas is introduced into the internal pressure-applying body to apply pressure and heat the mold simultaneously to produce a tube-like body. The internal pressure molding method has been preferred particularly for the molding of articles of a complicated shape such as golf club shaft, bat, and rackets for tennis and badminton.

As an example, the fiber reinforced composite material according to the invention can be produced by stacking sheets of the aforementioned prepreg according to the invention into a required shape and subsequently pressed under heat to cure the epoxy resin.

In another process, the fiber reinforced composite material according to the invention can also be produced from the aforementioned epoxy resin composition through a prepreg-free process.

This can be effected by, for instance, impregnating reinforcement fiber directly with the epoxy resin composition according to the invention, and subsequently heat-curing it, and available techniques include hand lay-up, filament winding, pultrusion, resin film infusion, resin injection molding, and resin transfer molding.

The use of polymer particles [Cx] insoluble in epoxy resin particles and meeting the aforementioned requirements from (x-i) to (x-iii) simultaneously, allows the fiber reinforced composite material according to the present invention to contain polymer particles densely filling the regions between the fiber layers. Accordingly, a fiber reinforced composite material with a much smaller interlayer thickness between fiber layers can be obtained compared with other cases where the same quantity of polymer particles exist in the interlayer regions, and as a result, the interlaminar toughness, $G_{Ic}$, will be adequately high. The interlayer thickness is preferably in the range of 20 to 35 μm, more preferably in the range of 25 to 33 μm. The interlayer thickness can be measured by, for instance, the following procedure. A specimen of a fiber reinforced composite material is cut in a direction perpendicular to the reinforcement fiber, and the cross section is polished and photographed with an optical microscope at a magnification of 200 or more. In an appropriately-selected region between fiber layers in the photograph, a line parallel to the reinforcement fiber layers is drawn so that it represents a reinforcement fiber volume content of 50%, and it is assumed to be a boundary line between the internal region of the fiber layer and the interlayer region between the fiber layers. A boundary line averaged over a length of 100 μm is drawn, and the distance between them is assumed to represent the interlayer thickness.

Figure 2:
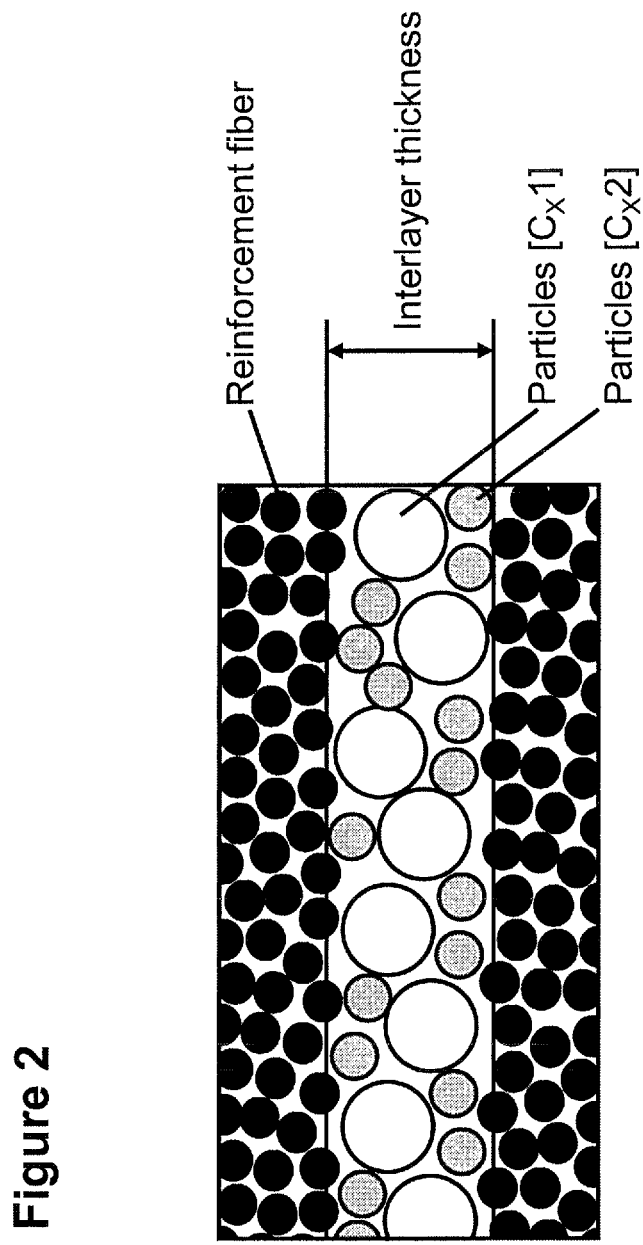
FIG. 2 is an exemplary schematic diagram of a cross-sectional image of a fiber reinforced composite material according to the present invention.

FIG. 2 is an exemplary schematic diagram of a cross-sectional image of a fiber reinforced composite material according to the present invention. An interlayer region that contains substantially no reinforcement fiber (for present invention, the expressions "a region between fiber layers" and "an interlayer region" have substantially the same meaning, and this also applies hereinafter) exists between reinforcement fiber layers that are composed mainly of reinforcement fiber and epoxy resin or cured epoxy resin, and polymer particles [Cx] are localized there in such a manner that the smaller-diameter component particles [Cx2], fill the space among larger-diameter component particles [Cx1] to ensure dense particle packing in the interlayer region, thereby providing a fiber reinforced composite material having a smaller interlayer thickness compared with other cases where the same quantity of polymer particles are disposed between the layers.

In the fiber reinforced composite material according to the present invention, polymer particles [Cx] preferably have a sphericity of 90 to 100, more preferably 96 to 100, as measured in an observed across section. As particles [Cx1], which have a particularly large particle diameter, maintain a high sphericity after molding, polymer particles [Cx] can have a high overall sphericity and a stable interlayer thickness can be ensured regardless of the molding conditions used, allowing interlayer toughness and other mechanical characteristics to be developed stably. The sphericity can be measured by, for instance, the following procedure. A specimen of a fiber reinforced composite material is cut in a direction perpendicular to the reinforcement fiber, and the cross section is polished and photographed with an optical microscope at a magnification of 200 or more. In the photograph, the major and minor axes of randomly selected 30 of particles [Cx] are measured, and the sphericity is calculated by the following equation from the average of the measurements.

$$\text{Sphericity} = \frac{\sum_{i=1}^{n} (\text{minor axis}/\text{major axis})}{n} \times 100 \qquad \text{[Formula 7]}$$

Here, n denotes the number of measurements, which is equal to 30.

The use of polymer particles [Cz] insoluble in epoxy resin and meeting all the aforementioned requirements from (z-i) to (z-iii) allows the fiber reinforced composite material according to the present invention to contain polymer particles sparsely filling the regions between the fiber layers. Accordingly, a fiber reinforced composite material with a much larger interlayer thickness between fiber layers can be obtained compared with other cases where the same quantity of polymer particles exist in the interlayer regions, and as a result, the interlaminar toughness, $G_{IIc}$, will be adequately high. The interlayer thickness is preferably in the range of 25 to 50 µm, more preferably in the range of 30 to 40 µm, depending on the structure and shape of the fiber reinforced composite material. The interlayer thickness can be measured by, for instance, the following procedure. A specimen of a fiber reinforced composite material is cut in a direction perpendicular to the reinforcement fiber, and the cross section is polished and photographed with an optical microscope at a magnification of 200 or more. In an appropriately-selected region between fiber layers in the photograph, a line parallel to the reinforcement fiber layers is drawn so that it represents a reinforcement fiber volume content of 50%, and it is assumed to be a boundary line between the internal region of the fiber layer and the interlayer region between the fiber layers. A boundary line averaged over a length of 100 µm is drawn, and the distance between them is assumed to represent the interlayer thickness.

In the fiber reinforced composite material according to the present invention, polymer particles [Cz] preferably have a sphericity of 90 to 100, more preferably 96 to 100, as measured in an observed across section. As particles [Cz], which have a particularly large particle diameter, maintain a high sphericity after molding, polymer particles [Cz] can have a high overall sphericity and a stable interlayer thickness can be ensured regardless of the molding conditions used, allowing interlayer toughness and other mechanical characteristics to be developed stably. The sphericity can be measured by, for instance, the following procedure. A specimen of a fiber reinforced composite material is cut in a direction perpendicular to the reinforcement fiber, and the cross section is polished and photographed with an optical microscope at a magnification of 200 or more. In the photograph, the major and minor axes of randomly selected 30 of particles [Cz] are measured, and the sphericity is calculated by the following equation from the average of the measurements.

$$\text{Sphericity} = \frac{\sum_{i=1}^{n}(\text{minor axis}/\text{major axis})}{n} \times 100 \quad \text{[Formula 8]}$$

Here, n denotes the number of measurements, which is equal to 30.

EXAMPLES

The prepreg and fiber reinforced composite materials according to the present invention are described in more detail below with reference to Examples. Described below are the resin materials used in Examples and the preparation and evaluation methods used for prepregs and fiber reinforced composite materials. Preparation and evaluation of prepregs in Examples were performed in an atmosphere with a temperature of 25° C.±2° C. and relative humidity of 50% unless otherwise specified.
<Reinforcement Fiber (Carbon Fiber)>
  Torayca (registered trademark) T800G-24K-31E (carbon fiber with 24,000 filaments/bundle, tensile strength of 5.9 GPa, tensile modulus of 294 GPa, tensile elongation of 2.0%, supplied by Toray Industries, Inc.).

<Epoxy Resin [A]>
  Sumiepoxy (registered trademark) ELM434 (tetraglycidyl diaminodiphenyl methane, supplied by Sumitomo Chemical Co., Ltd.)
  Araldite (registered trademark) MY0600 (m-aminophenol type epoxy resin, epoxy equivalent 118, supplied by Huntsman Advanced Materials K.K.)
  Epiclon (registered trademark) 830 (bisphenol F type epoxy resin, supplied by DIC)
<Epoxy Resin Curing Agent [B]>
  3,3'-DAS (3,3'-diaminodiphenyl sulfone, supplied by Mitsui Fine Chemical, Inc.)
<Other Components>
  Sumikaexcel (registered trademark) PES5003P (polyethersulfone, supplied by Sumitomo Chemical Co., Ltd.)
<Polymer Particles [C]>
  Particle x1 (particles produced from Trogamid (registered trademark) CX7323 used as raw material, and having an average particle diameter of 25 particle diameter distribution index of 1.3, sphericity of 96, and Tg of 137° C.).

(Production Method for Particle x1: By Reference to International Publication WO 2009/142231)
  In a 1,000 ml pressure resistant glass autoclave (Hyperglasstor TEM-V1000N, supplied by Taiatsu Techno Corporation), 39 g of polyamide (Trogamid (registered trademark) CX7323, supplied by Degussa, weight average molecular weight 17,000) used as polymer A, 283 g of N-methyl-2-pyrolidone used as organic solvent, and 28 g of polyvinyl alcohol (Gohsenol (registered trademark) GM-14, supplied by Nippon Synthetic Chemical Industry Co., Ltd., weight average molecular weight 29,000, sodium acetate content 0.23 mass %, SP value 32.8 $(J/cm^3)^{1/2}$) used as polymer B were fed and the autoclave was filled with nitrogen to more than 99 vol. %, followed by heating at 180° C. and stirring for 2 hours to ensure dissolution of the polymers. Subsequently, 350 g of ion-exchanged water, used as poor solvent, was supplied through a solution feeding pump, and dropped at a rate of 2.92 g/min. The solution turned to white when about 200 g of the ion-exchanged water had been added. After finishing the addition of the total quantity of water, the temperature was lowered while continuing stirring, and the resulting suspension liquid was filtered, followed by reslurry washing with 700 g of ion-exchanged water and separation of solid material, which was then vacuum-dried at 80° C. for 10 hours to provide 37 g of a white solid material. The resulting powder was observed by scanning electron microscopy and found to be highly spherical fine particles of polyamide with an average particle diameter of 25 µm and particle diameter distribution index of 1.3.
  Particle x2 (particles produced from Trogamid (registered trademark) CX7323 used as raw material, and having an average particle diameter of 18 µm, particle diameter distribution index of 1.2, sphericity of 98, and Tg of 137° C.).

(Production Method for Particle x2: By Reference to International Publication WO 2009/142231)
  In a 1,000 ml pressure resistant glass autoclave (Hyperglasstor TEM-V1000N, supplied by Taiatsu Techno Corporation), 37 g of polyamide (Trogamid (registered trademark) CX7323, supplied by Degussa, weight average molecular weight 17,000) used as polymer A, 285 g of N-methyl-2-pyrolidone used as organic solvent, and 28 g of polyvinyl alcohol (Gohsenol (registered trademark) GM-14, supplied by Nippon Synthetic Chemical Industry Co., Ltd., weight average molecular weight 29,000, sodium acetate content 0.23 mass %, SP value 32.8 $(J/cm^3)^{1/2}$) used as polymer B were fed and the autoclave was filled with nitrogen to more than 99 vol. %, followed by heating at 180° C. and stirring for 2 hours to ensure dissolution of the polymers. Subsequently, 350 g of ion-exchanged water, used as poor solvent, was supplied through a solution feeding pump, and dropped at a rate of 2.92 g/min. The solution turned to white when about 200 g of the ion-exchanged water had been added. After finishing the addition of the total quantity of water, the temperature was lowered while continuing stirring, and the resulting suspension liquid was filtered, followed by reslurry washing with 700 g of ion-exchanged water and separation of solid material, which was then vacuum-dried at 80° C. for 10 hours to provide 36 g of a white solid material. The resulting powder was observed by scanning electron microscopy and found to be highly spherical fine particles of polyamide with an average particle diameter of 18 μm and particle diameter distribution index of 1.2.

Particle x3 (particles produced from Trogamid (registered trademark) CX7323 used as raw material, and having an average particle diameter of 13 μm, particle diameter distribution index of 1.2, sphericity of 97, and Tg of 137° C.).

(Production Method for Particle x3: By Reference to International Publication WO 2009/142231)

In a 1,000 ml pressure resistant glass autoclave (Hyperglasstor TEM-V1000N, supplied by Taiatsu Techno Corporation), 35 g of polyamide (Trogamid (registered trademark) CX7323, supplied by Degussa, weight average molecular weight 17,000) used as polymer A, 287 g of N-methyl-2-pyrolidone used as organic solvent, and 28 g of polyvinyl alcohol (Gohsenol (registered trademark) GM-14, supplied by Nippon Synthetic Chemical Industry Co., Ltd., weight average molecular weight 29,000, sodium acetate content 0.23 mass %, SP value 32.8 $(J/cm^3)^{1/2}$) used as polymer B were fed and the autoclave was filled with nitrogen to more than 99 vol. %, followed by heating at 180° C. and stirring for 2 hours to ensure dissolution of the polymers. Subsequently, 350 g of ion-exchanged water, used as poor solvent, was supplied through a solution feeding pump, and dropped at a rate of 2.92 g/min. The solution turned to white when about 200 g of the ion-exchanged water had been added. After finishing the addition of the total quantity of water, the temperature was lowered while continuing stirring, and the resulting suspension liquid was filtered, followed by reslurry washing with 700 g of ion-exchanged water and separation of solid material, which was then vacuum-dried at 80° C. for 10 hours to provide 34 g of a white solid material. The resulting powder was observed by scanning electron microscopy and found to be highly spherical fine particles of polyamide with an average particle diameter of 13 μm and particle diameter distribution index of 1.2.

Particle x4 (particles produced from Trogamid (registered trademark) CX7323 used as raw material, and having an average particle diameter of 8 μm, particle diameter distribution index of 1.1, sphericity of 98, and Tg of 137° C.).

(Production Method for Particle x4: By Reference to International Publication WO 2009/142231)

In a 1,000 ml pressure resistant glass autoclave (Hyperglasstor TEM-V1000N, supplied by Taiatsu Techno Corporation), 35 g of polyamide (Trogamid (registered trademark) CX7323, supplied by Degussa, weight average molecular weight 17,000) used as polymer A, 280 g of N-methyl-2-pyrolidone used as organic solvent, and 35 g of polyvinyl alcohol (Gohsenol (registered trademark) GM-14, supplied by Nippon Synthetic Chemical Industry Co., Ltd., weight average molecular weight 29,000, sodium acetate content 0.23 mass %, SP value 32.8 $(J/cm^3)^{1/2}$) used as polymer B were fed and the autoclave was filled with nitrogen to more than 99 vol. %, followed by heating at 180° C. and stirring for 2 hours to ensure dissolution of the polymers. Subsequently, 350 g of ion-exchanged water, used as poor solvent, was supplied through a solution feeding pump, and dropped at a rate of 2.92 g/min. The solution turned to white when about 200 g of the ion-exchanged water had been added. After finishing the addition of the total quantity of water, the temperature was lowered while continuing stirring, and the resulting suspension liquid was filtered, followed by reslurry washing with 700 g of ion-exchanged water and separation of solid material, which was then vacuum-dried at 80° C. for 10 hours to provide 34 g of a white solid material. The resulting powder was observed by scanning electron microscopy and found to be highly spherical fine particles of polyamide with an average particle diameter of 8 μM and particle diameter distribution index of 1.1.

Particle x5 (particles produced from Trogamid (registered trademark) CX7323 used as raw material, and having an average particle diameter of 4 μM, particle diameter distribution index of 1.2, sphericity of 98, and Tg of 137° C.).

(Production Method for Particle x5: By Reference to International Publication WO 2009/142231)

In a 1,000 ml pressure resistant glass autoclave (Hyperglasstor TEM-V1000N, supplied by Taiatsu Techno Corporation), 20 g of polyamide (Trogamid (registered trademark) CX7323, supplied by Degussa, weight average molecular weight 17,000) used as polymer A, 295 g of N-methyl-2-pyrolidone used as organic solvent, and 35 g of polyvinyl alcohol (Gohsenol (registered trademark) GM-14, supplied by Nippon Synthetic Chemical Industry Co., Ltd., weight average molecular weight 29,000, sodium acetate content 0.23 mass %, SP value 32.8 $(J/cm^3)^{1/2}$) used as polymer B were fed and the autoclave was filled with nitrogen to more than 99 vol. %, followed by heating at 180° C. and stiffing for 2 hours to ensure dissolution of the polymers. Subsequently, 350 g of ion-exchanged water, used as poor solvent, was supplied through a solution feeding pump, and dropped at a rate of 2.92 g/min. The solution turned to white when about 200 g of the ion-exchanged water had been added. After finishing the addition of the total quantity of water, the temperature was lowered while continuing stirring, and the resulting suspension liquid was filtered, followed by reslurry washing with 700 g of ion-exchanged water and separation of solid material, which was then vacuum-dried at 80° C. for 10 hours to provide 26 g of a white solid material. The resulting powder was observed by scanning electron microscopy and found to be highly spherical fine particles of polyamide with an average particle diameter of 4 μm and particle diameter distribution index of 1.2.

Particle x6 (Orgasol (registered trademark) 1002D, supplied by Arkema K.K., average particle diameter 20 μm, particle diameter distribution 1.30, sphericity 97, Tg 53° C.)

Particle x7 (Particles produced from Grilamid (registered trademark) TR55 supplied by Emser Werke, Inc., used as starting material, and having an average particle diameter of 18.0 μm, particle diameter distribution of 1.52, sphericity of 85, and Tg of 160° C.).

(Production Method for Particle x7)

First, 94 parts by mass of polyamide (Grilamid (registered trademark) TR-55, supplied by Emser Werke, Inc.) that contained 4,4'-diamino-3,3'-dimethyl dicyclohexyl methane as essential component, 4 parts by mass of epoxy resin (jER (registered trademark) 828 supplied by Japan Epoxy Resins Co., Ltd.), and 2 parts by mass of a curing agent (Tormide (registered trademark) #296 supplied by Fuji Kasei Kogyo Co., Ltd.) were added to a mixed solvent composed of 300 parts by mass of chloroform and 100 parts by mass of methanol to provide a uniform solution. Then, using a spray gun for painting, the solution was sprayed strongly against the liquid surface of 3,000 parts by mass of well-stirred n-hexane in order to separate out the solute. The solid material thus separated was filtered out, washed well with n-hexane, vacuum-dried at 100° C. for 24 hours, and passed through sieves to remove particles with small diameters and those with large diameters to obtain transparent polyamide particles with a relatively narrow particle diameter distribution. The resulting powder was observed by scanning electron microscopy and it was found to be fine particles of polyamide with an average particle diameter of 18.0 particle diameter distribution index of 1.52, and sphericity of Particle x8 (SP-500, supplied by Toray Industries, Inc., average particle diameter 5.0 μm, particle diameter distribution 1.1, sphericity 96, Tg 55° C.)

Particle x9 (Toraypearl (registered trademark) TN, supplied by Toray Industries, Inc., average particle diameter 13.0 μm, particle diameter distribution 2.10, sphericity 96, Tg 167° C.)

Particle x10 (particles produced from Sumikaexcel (registered trademark) 5003P used as raw material, and having an average particle diameter 19 μm, particle diameter distribution 1.1, sphericity of 98, and Tg of 210° C.).

(Production Method for Particle x10)

In a 1,000 ml four-neck flask, 2.5 g of polyethersulfone (Sumikaexcel (registered trademark) 5003P, supplied by Sumitomo Chemical Co., Ltd., weight average molecular weight 67,000) as polymer A, 45 g of N-methyl-2-pyrolidone as organic solvent, and 2.5 g of polyvinyl alcohol (Gohsenol (registered trademark) GL-05, supplied by Nippon Synthetic Chemical Industry Co., Ltd., weight average molecular weight 10,600, SP value 32.8 $(J/cm^3)^{1/2}$) as polymer B were heated at 80° C. and stirred to ensure dissolution of the polymers. After lowering the temperature of the system back to room temperature, 50 g of ion-exchanged water, which was used as poor solvent, was dropped through a water supply pump at a rate of 0.41 g/min while stirring the solution at 450 rpm. The solution turned to white when about 12 g of ion-exchanged water had been added. After finishing the addition of the total quantity of water, stirring was continued for 30 min, and the resulting suspension liquid was filtered, followed by washing with 100 g of ion-exchanged water and vacuum-drying of the separated material at 80° C. for 10 hours to provide 2.0 g of a white solid material. The resulting powder was observed by scanning electron microscopy and found to be fine particles of polyethersulfone with a sphericity of 96, average particle diameter of 19 μm, and particle diameter distribution index of 1.7.

Particle y1 (particles produced from Trogamid (registered trademark) CX7323 used as raw material, and having an average particle diameter 20 μm, particle diameter distribution 1.2, sphericity of 97, and Tg of 137° C.)

(Production Method for Particle y1: By Reference to International Publication WO 2009/142231

In a 1,000 ml four-neck flask, 20 g of polyamide (weight average molecular weight 17,000, Trogamid (registered trademark) CX7323, supplied by Degussa) used as polymer A, 500 g formic acid used as an organic solvent, and 20 g of polyvinyl alcohol (PVA 1000, supplied by Wako Pure Chemical Industries, Ltd., SP value 32.8 $(J/cm^3)^{1/2}$) used as polymer B were heated at 80° C. and stirred to ensure dissolution of the polymers. After lowering the temperature of the system to 55° C., 500 g of ion-exchanged water, which was used as poor solvent, started to be added through a water supply pump at a rate of 0.5 g/min while maintaining an adequately stirred state and stirring the solution at 900 rpm. The dripping rate was gradually increased as the addition was continued, and the addition of the entire quantity was finished in 90 min. The solution turned to white when 100 g of ion-exchanged water had been added. When a half quantity of the ion-exchanged water had been added, the temperature of the solution was raised to 60° C., and subsequently the remaining ion-exchanged water was poured. After finishing the addition of the entire quantity, stirring was continued for additional 30 min. The resulting suspension liquid was cooled to room temperature and filtered, followed by washing with 500 g of ion-exchanged water and vacuum-drying at 80° C. for 10 hours to provide 11 g of a white solid material. The resulting powder was observed by scanning electron microscopy and found to be fine particles of polyamide with an average particle diameter of 20 μm and particle diameter distribution index of 1.2.

Particle y2 (particles produced from Trogamid (registered trademark) CX7323 used as raw material, and having an average particle diameter of 18 μm, particle diameter distribution index of 1.3, sphericity of 98, and Tg of 137° C.).

(Production Method for Particle y2: By Reference to International Publication WO 2009/142231)

In a 1,000 ml pressure resistant glass autoclave (Hyperglasstor TEM-V1000N, supplied by Taiatsu Techno Corporation), 37 g of polyamide (Trogamid (registered trademark) CX7323, supplied by Degussa, weight average molecular weight 17,000) used as polymer A, 285 g of N-methyl-2-pyrolidone used as organic solvent, and 28 g of polyvinyl alcohol (Gohsenol (registered trademark) GM-14, supplied by Nippon Synthetic Chemical Industry Co., Ltd., weight average molecular weight 29,000, sodium acetate content 0.23 mass %, SP value 32.8 $(J/cm^3)^{1/2}$) used as polymer B were fed and the autoclave was filled with nitrogen to more than 99 vol. %, followed by heating at 180° C. and stirring for 2 hours to ensure dissolution of the polymers. Subsequently, 350 g of ion-exchanged water, used as poor solvent, was supplied through a solution feeding pump, and dropped at a rate of 2.92 g/min. The solution turned to white when about 200 g of the ion-exchanged water had been added. After finishing the addition of the total quantity of water, the temperature was lowered while continuing stirring, and the resulting suspension liquid was filtered, followed by reslurry washing with 700 g of ion-exchanged water and separation of solid material, which was then vacuum-dried at 80° C. for 10 hours to provide 36 g of a white solid material. The resulting powder was observed by scanning electron microscopy and found to be highly spherical fine particles of polyamide with an average particle diameter of 18 μm and particle diameter distribution index of 1.3.

Particle y3 (particles produced from Trogamid (registered trademark) CX7323 used as raw material, and having an average particle diameter of 15 μm, particle diameter distribution index of 1.2, sphericity of 97, and Tg of 137° C.).

(Production Method for Particle y3: By Reference to International Publication WO 2009/142231)

In a 1,000 ml pressure resistant glass autoclave (Hyperglasstor TEM-V1000N, supplied by Taiatsu Techno Corporation), 35 g of polyamide (Trogamid (registered trademark) CX7323, supplied by Degussa, weight average molecular weight 17,000) used as polymer A, 285 g of N-methyl-2-pyrolidone used as organic solvent, and 28 g of polyvinyl alcohol (Gohsenol (registered trademark) GM-14, supplied by Nippon Synthetic Chemical Industry Co., Ltd., weight average molecular weight 29,000, sodium acetate content 0.23 mass %, SP value 32.8 $(\text{Pcm}^3)^{1/2}$) used as polymer B were fed and the autoclave was filled with nitrogen to more than 99 vol. %, followed by heating at 180° C. and stirring for 2 hours to ensure dissolution of the polymers. Subsequently, 350 g of ion-exchanged water, used as poor solvent, was supplied through a solution feeding pump, and dropped at a rate of 2.92 g/min. The solution turned to white when about 200 g of the ion-exchanged water had been added. After finishing the addition of the total quantity of water, the temperature was lowered while continuing stirring, and the resulting suspension liquid was filtered, followed by reslurry washing with 700 g of ion-exchanged water and separation of solid material, which was then vacuum-dried at 80° C. for 10 hours to provide 34 g of a white solid material. The resulting powder was observed by scanning electron microscopy and found to be highly spherical fine particles of polyamide with an average particle diameter of 15 μm and particle diameter distribution index of 1.2.

Particle y4 (particles produced from Trogamid (registered trademark) CX7323 used as raw material, and having an average particle diameter of 12 μm, particle diameter distribution index of 1.2, sphericity of 96, and Tg of 137° C.).

(Production Method for Particle y4: By Reference to International Publication WO 2009/142231)

In a 1,000 ml pressure resistant glass autoclave (Hyperglasstor TEM-V1000N, supplied by Taiatsu Techno Corporation), 35 g of polyamide (Trogamid (registered trademark) CX7323, supplied by Degussa, weight average molecular weight 17,000) used as polymer A, 285 g of N-methyl-2-pyrolidone used as organic solvent, and 30 g of polyvinyl alcohol (Gohsenol (registered trademark) GM-14, supplied by Nippon Synthetic Chemical Industry Co., Ltd., weight average molecular weight 29,000, sodium acetate content 0.23 mass %, SP value 32.8 $(\text{J/cm}^3)^{1/2}$) used as polymer B were fed and the autoclave was filled with nitrogen to more than 99 vol. %, followed by heating at 180° C. and stirring for 2 hours to ensure dissolution of the polymers. Subsequently, 350 g of ion-exchanged water, used as poor solvent, was supplied through a solution feeding pump, and dropped at a rate of 2.92 g/min. The solution turned to white when about 200 g of the ion-exchanged water had been added. After finishing the addition of the total quantity of water, the temperature was lowered while continuing stirring, and the resulting suspension liquid was filtered, followed by reslurry washing with 700 g of ion-exchanged water and separation of solid material, which was then vacuum-dried at 80° C. for 10 hours to provide 34 g of a white solid material. The resulting powder was observed by scanning electron microscopy and found to be highly spherical fine particles of polyamide with an average particle diameter of 12 μm and particle diameter distribution index of 1.2.

Particle y5 (particles produced from Trogamid (registered trademark) CX7323 used as raw material, and having an average particle diameter of 8 μm, particle diameter distribution of 1.1, sphericity of 98, and Tg of 137° C.).

(Production Method for Particle y5: By Reference to International Publication WO 2009/142231)

In a 1,000 ml pressure-resistant glass autoclave (Hyperglasstor TEM-V1000N, supplied by Taiatsu Techno Corporation), 35 g of polyamide (Trogamid (registered trademark) CX7323, supplied by Degussa, weight average molecular weight 17,000) used as polymer A, 280 g of N-methyl-2-pyrolidone used as organic solvent, and 35 g of polyvinyl alcohol (Gohsenol (registered trademark) GM-14, supplied by Nippon Synthetic Chemical Industry Co., Ltd., weight average molecular weight 29,000, sodium acetate content 0.23 mass %, SP value 32.8 $(\text{J/cm}^3)^{1/2}$) used as polymer B were fed and the autoclave was filled with nitrogen to more than 99 vol. %, followed by heating at 180° C. and stirring for 2 hours to ensure dissolution of the polymers. Subsequently, 350 g of ion-exchanged water, used as poor solvent, was supplied through a solution feeding pump, and dropped at a rate of 2.92 g/min. The solution turned to white when about 200 g of the ion-exchanged water had been added. After finishing the addition of the total quantity of water, the temperature was lowered while continuing stirring, and the resulting suspension liquid was filtered, followed by reslurry washing with 700 g of ion-exchanged water and separation of solid material, which was then vacuum-dried at 80° C. for 10 hours to provide 34 g of a white solid material. The resulting powder was observed by scanning electron microscopy and found to be highly spherical fine particles of polyamide with an average particle diameter of 8 μm and particle diameter distribution index of 1.1.

Particle y6 (particles produced from Trogamid (registered trademark) CX7323 used as raw material, and having an average particle diameter of 4 μm, particle diameter distribution of 2.5, sphericity of 97, and Tg of 137° C.).

(Production Method for Particle y6: By Reference to International Publication WO 2009/142231)

In a 1,000 ml pressure-resistant glass autoclave (Hyperglasstor TEM-V1000N, supplied by Taiatsu Techno Corporation), 20 g of polyamide (Trogamid (registered trademark) CX7323, supplied by Degussa, weight average molecular weight 17,000) used as polymer A, 295 g of N-methyl-2-pyrolidone used as organic solvent, and 35 g of polyvinyl alcohol (Gohsenol (registered trademark) GM-14, supplied by Nippon Synthetic Chemical Industry Co., Ltd., weight average molecular weight 29,000, sodium acetate content 0.23 mass %, SP value 32.8 $(\text{J/cm}^3)^{1/2}$) used as polymer B were fed and the autoclave was filled with nitrogen to more than 99 vol. %, followed by heating at 180° C. and stirring for 2 hours to ensure dissolution of the polymers. Subsequently, 350 g of ion-exchanged water, used as poor solvent, was supplied through a solution feeding pump, and dropped at a rate of 2.92 g/min. The solution turned to white when about 200 g of the ion-exchanged water had been added. After finishing the addition of the total quantity of water, the temperature was lowered while continuing stirring, and the resulting suspension liquid was filtered, followed by reslurry washing with 700 g of ion-exchanged water and separation of solid material, which was then vacuum-dried at 80° C. for 10 hours to provide 26 g of a white solid material. The resulting powder was observed by scanning electron microscopy and found to be highly spherical fine particles of polyamide with an average particle diameter of 4 μm and particle diameter distribution index of 2.5.

Particle y7 (Particles produced from Grilamid (registered trademark) TR90 used as starting material and having an average particle diameter of 10 μm, particle diameter distribution of 1.5, sphericity of 96, and Tg of 152° C.)

(Production Method for Particle y7)

First, 22 parts by mass of polyamide (Grilamid (registered trademark) 1R90, supplied by Emser Werke, Inc.) that contained 4,4'-diamino-3,3'-dimethyl dicyclohexyl methane and 1,12-dodecane dicarboxylic acid as essential components was added to a mixed solvent consisting of 225 parts by mass of chloroform and 75 parts by mass of methanol to provide a uniform solution. Then, while the solution was stirred at 450 rpm, 185 parts by mass of an aqueous solution containing 6 mass % of polyvinyl alcohol (supplied by Kanto Chemical Co., Inc.) was dropped little by little to prepare a liquid containing particles dispersed in a dispersion medium, followed by removing the solvent to provide fine particles of polyamide.

Particle y8 (particles produced from polycarbonate used as raw material, and having an average particle diameter of 10 μm, particle diameter distribution of 1.1, sphericity of 91, and Tg of 145° C.).

(Production Method for Particle y8: By Reference to International Publication WO 2009/142231)

In a 1,000 ml four-neck flask, 2.5 g of polycarbonate (Iupilon (registered trademark) E2000, supplied by Mitsubishi Engineering-Plastics Corporation, weight average molecular weight 45,000), 45 g of N-methyl-2-pyrolidone used as organic solvent, and 2.5 g of polyvinyl alcohol (Gohsenol (registered trademark) GL-5 supplied by Nippon Synthetic Chemical Industry Co., Ltd. industry) were heated at 80° C. and stirred to ensure dissolution of the polymers. After lowering the temperature of the system back to room temperature, 50 g of ion-exchanged water, which was used as poor solvent, was dropped through a water supply pump at a rate of 0.41 g/min while stirring the solution at 450 rpm. The solution turned to white when about 12 g of the ion-exchanged water had been added. After finishing the addition of the total quantity of water, stirring was continued for 30 min, and the resulting suspension liquid was filtered, followed by washing with 100 g of ion-exchanged water and vacuum-drying of the separated material at 80° C. for 10 hours to provide 2.15 g of a white solid material. The resulting powder was observed by scanning electron microscopy and found to be rough-surfaced fine particles of polycarbonate with an average particle diameter of 10 μm and particle diameter distribution index of 1.1.

Particle y9 (particles produced from Trogamid (registered trademark) CX7323 used as raw material, and having an average particle diameter of 12 μm, particle diameter distribution of 2.6, sphericity of 72, and Tg of 137° C.).

(Production Method for Particle y9)

Polyamide (Trogamid (registered trademark) CX7323, supplied by Degussa, weight average molecular weight 17,000) was freeze-fractured. The resulting powder was observed by scanning electron microscopy and found to be anisotropic fine particles of polyamide with an average particle diameter of 12 μm and particle diameter distribution index of 2.6.

Particle y10 (Particles produced from Grilamid (registered trademark) TR55 supplied by Emser Werke, Inc., used as starting material, and having an average particle diameter of 13 μm, particle diameter distribution of 2.1, sphericity of 94, and Tg of 160° C.).

(Production Method for Particle y10)

First, 100 parts by mass of polyamide (Grilamid (registered trademark) TR-55, supplied by Emser Werke, Inc.) that contained 4,4'-diamino-3,3'-dimethyl dicyclohexyl methane as essential component was added to a mixed solvent consisting of 300 parts by mass of chloroform and 100 parts by mass of methanol to provide a uniform solution. Then, while the solution was stirred at 450 rpm, 185 parts by mass of an aqueous solution containing 6 mass % of polyvinyl alcohol (supplied by Kanto Chemical Co., Inc.) was dropped little by little to prepare a liquid containing particles dispersed in a dispersion medium, followed by removing the solvent to provide fine particles of polyamide. The resulting powder was observed by scanning electron microscopy and it was found to be fine particles of polyamide with an average particle diameter of 13 μm, particle diameter distribution index of 2.1, and sphericity of 94.

Particle y11 (SP-500, supplied by Toray Industries, Inc., average particle diameter 5 μm, particle diameter distribution 1.1, sphericity 96, Tg 41° C.)

Particle y12 (particles produced from polyetherimide used as raw material, and having an average particle diameter of 0.7 μm, particle diameter distribution of 1.1, sphericity of 96, and Tg of 217° C.).

(Production Method for Particle y1: By Reference to International Publication WO 2009/142231

In a 1,000 ml four-neck flask, 2.5 g of polyetherimide (Ultem (registered trademark) 1010, supplied by GE Plastics, weight average molecular weight 55,000), 45 g of N-methyl-2-pyrolidone as organic solvent, and 2.5 g of polyvinyl alcohol (Gohsenol (registered trademark) GL-5, supplied by Nippon Synthetic Chemical Industry Co., Ltd.) were heated at 80° C. and stirred to ensure dissolution of all polymers. After lowering the temperature of the system back to room temperature, 50 g of ion-exchanged water, which was used as poor solvent, was dropped through a water supply pump at a rate of 0.41 g/min while stirring the solution at 450 rpm. The solution turned to white when 12 g of ion-exchanged water had been added. After adding the entire quantity of water, the solution was stirred for 30 minutes. An additional 50 g of water was added at once, and the resulting suspension liquid subjected to centrifugal separation in a centrifugal separator for 20 minutes at a centrifugal acceleration equal to 20,000 times the gravity acceleration, and the supernatant liquid was removed. The resulting solid material was filtered, washed with 100 g of ion-exchanged water, and vacuum-dried at 80° C. for 10 hours to provide 2.1 g of a white solid material. The resulting powder was observed by scanning electron microscopy and found to be highly spherical fine particles of polyetherimide with an average particle diameter of 0.7 μm and particle diameter distribution of 1.1.

Particle z1 (particles produced from Trogamid (registered trademark) CX7323 used as raw material, and having an average particle diameter of 25 μm, particle diameter distribution index of 1.3, sphericity of 96, and Tg of 137° C.).

(Production Method for Particle z1: By Reference to International Publication WO 2009/142231)

In a 1,000 ml pressure-resistant glass autoclave (Hyperglasstor TEM-V1000N, supplied by Taiatsu Techno Corporation), 39 g of polyamide (Trogamid (registered trademark) CX7323, supplied by Degussa, weight average molecular weight 17,000) used as polymer A, 283 g of N-methyl-2-pyrolidone used as organic solvent, and 28 g of polyvinyl alcohol (Gohsenol (registered trademark) GM-14, supplied by Nippon Synthetic Chemical Industry Co., Ltd., weight average molecular weight 29,000, sodium acetate content 0.23 mass %, SP value 32.8 $(J/cm^3)^{1/2}$) used as polymer B were fed and the autoclave was filled with nitrogen to 99 vol. %, followed by heating at 180° C. and stirring for 2 hours to ensure dissolution of the polymers. Subsequently, 350 g of ion-exchanged water, used as poor solvent, was supplied through a solution feeding pump, and dropped at a rate of 2.92 g/min. The solution turned to white when about 200 g of the ion-exchanged water had been added. After finishing the addition of the total quantity of water, the temperature was lowered while continuing stirring, and the resulting suspension liquid was filtered, followed by reslurry washing with 700 g of ion-exchanged water to separate solid material, which was then vacuum-dried at 80° C. for 10 hours to provide 37 g of a white solid material. The resulting powder was observed by scanning electron microscopy and found to be highly spherical fine particles of polyamide with an average particle diameter of 25 μm and particle diameter distribution index of 1.3.

Particle z2 (particles produced from Trogamid (registered trademark) CX7323 used as raw material, and having an average particle diameter of 18 μm, particle diameter distribution index of 1.2, sphericity of 98, and Tg of 137° C.).

(Production Method for Particle z2: By Reference to International Publication WO 2009/142231)

In a 1,000 ml pressure resistant glass autoclave (Hyperglasstor TEM-V1000N, supplied by Taiatsu Techno Corporation), 37 g of polyamide (Trogamid (registered trademark) CX7323, supplied by Degussa, weight average molecular weight 17,000) used as polymer A, 285 g of N-methyl-2-pyrolidone used as organic solvent, and 28 g of polyvinyl alcohol (Gohsenol (registered trademark) GM-14, supplied by Nippon Synthetic Chemical Industry Co., Ltd., weight average molecular weight 29,000, sodium acetate content 0.23 mass %, SP value 32.8 $(J/cm^3)^{1/2}$) used as polymer B were fed and the autoclave was filled with nitrogen to more than 99 vol. %, followed by heating at 180° C. and stirring for 2 hours to ensure dissolution of the polymers. Subsequently, 350 g of ion-exchanged water, used as poor solvent, was supplied through a solution feeding pump, and dropped at a rate of 2.92 g/min. The solution turned to white when about 200 g of the ion-exchanged water had been added. After finishing the addition of the total quantity of water, the temperature was lowered while continuing stirring, and the resulting suspension liquid was filtered, followed by reslurry washing with 700 g of ion-exchanged water and separation of solid material, which was then vacuum-dried at 80° C. for 10 hours to provide 36 g of a white solid material. The resulting powder was observed by scanning electron microscopy and found to be highly spherical fine particles of polyamide with an average particle diameter of 18 μm and particle diameter distribution index of 1.2.

Particle z3 (particles produced from Trogamid (registered trademark) CX7323 used as raw material, and having an average particle diameter of 13 μm, particle diameter distribution index of 1.2, sphericity of 97, and Tg of 137° C.).

(Production Method for Particle z3: By Reference to International Publication WO 2009/142231)

In a 1,000 ml pressure-resistant glass autoclave (Hyperglasstor TEM-V1000N, supplied by Taiatsu Techno Corporation), 35 g of polyamide (Trogamid (registered trademark) CX7323, supplied by Degussa, weight average molecular weight 17,000) used as polymer A, 287 g of N-methyl-2-pyrolidone used as organic solvent, and 28 g of polyvinyl alcohol (Gohsenol (registered trademark) GM-14, supplied by Nippon Synthetic Chemical Industry Co., Ltd., weight average molecular weight 29,000, sodium acetate content 0.23 mass %, SP value 32.8 $(J/cm^3)^{1/2}$) used as polymer B were fed and the autoclave was filled with nitrogen to more than 99 vol. %, followed by heating at 180° C. and stirring for 2 hours to ensure dissolution of the polymers. Subsequently, 350 g of ion-exchanged water, used as poor solvent, was supplied through a solution feeding pump, and dropped at a rate of 2.92 g/min. The solution turned to white when about 200 g of the ion-exchanged water had been added. After finishing the addition of the total quantity of water, the temperature was lowered while continuing stirring, and the resulting suspension liquid was filtered, followed by reslurry washing with 700 g of ion-exchanged water and separation of solid material, which was then vacuum-dried at 80° C. for 10 hours to provide 34 g of a white solid material. The resulting powder was observed by scanning electron microscopy and found to be highly spherical fine particles of polyamide with an average particle diameter of 13 μm and particle diameter distribution index of 1.2.

Particle z4 (particles produced from Trogamid (registered trademark) CX7323 used as raw material, and having an average particle diameter of 8 μm, particle diameter distribution of 1.1, sphericity of 98, and Tg of 137° C.).

(Production Method for Particle z4: By Reference to International Publication WO 2009/142231)

In a 1,000 ml pressure-resistant glass autoclave (Hyperglasstor TEM-V1000N, supplied by Taiatsu Techno Corporation), 35 g of polyamide (Trogamid (registered trademark) CX7323, supplied by Degussa, weight average molecular weight 17,000) used as polymer A, 280 g of N-methyl-2-pyrolidone used as organic solvent, and 35 g of polyvinyl alcohol (Gohsenol (registered trademark) GM-14, supplied by Nippon Synthetic Chemical Industry Co., Ltd., weight average molecular weight 29,000, sodium acetate content 0.23 mass %, SP value 32.8 $(J/cm^3)^{1/2}$) used as polymer B were fed and the autoclave was filled with nitrogen to more than 99 vol. %, followed by heating at 180° C. and stirring for 2 hours to ensure dissolution of the polymers. Subsequently, 350 g of ion-exchanged water, used as poor solvent, was supplied through a solution feeding pump, and dropped at a rate of 2.92 g/min. The solution turned to white when about 200 g of the ion-exchanged water had been added. After finishing the addition of the total quantity of water, the temperature was lowered while continuing stirring, and the resulting suspension liquid was filtered, followed by reslurry washing with 700 g of ion-exchanged water and separation of solid material, which was then vacuum-dried at 80° C. for 10 hours to provide 34 g of a white solid material. The resulting powder was observed by scanning electron microscopy and found to be highly spherical fine particles of polyamide with an average particle diameter of 8 μm and particle diameter distribution index of 1.1.

Particle z5 (Particles produced from Grilamid (registered trademark) TR90 used as starting material and having an average particle diameter of 46 μm, particle diameter distribution of 2.7, sphericity of 93, and Tg of 152° C.)

(Production Method for Particle z5)

First, 22 parts by mass polyamide (Grilamid (registered trademark) TR90, supplied by Emser Werke, Inc.), which contains 4,4'-diamino-3,3'-dimethyl dicyclohexyl methane and 1,12-dodecane dicarboxylic acid as essential components, was added to a mixed solvent consisting of 225 parts by mass of chloroform and 75 parts by mass of methanol to provide a uniform solution. Then, while the solution was stirred at 450 rpm, 185 parts by mass of an aqueous solution containing 2 mass % of polyvinyl alcohol (supplied by Kanto Chemical Co., Inc.) was dropped little by little to prepare a liquid containing particles dispersed in a dispersion medium, followed by removing the solvent to provide fine particles of polyamide.

Particle z6 (particles produced from Trogamid (registered trademark) CX7323 used as raw material, and having an average particle diameter of 15 μm, particle diameter distribution index of 2.8, sphericity of 75, and Tg of 137° C.).

(Production Method for Particle z6)

Polyamide (Trogamid (registered trademark) CX7323, supplied by Degussa, weight average molecular weight 17,000) was freeze-fractured. The resulting powder was observed by scanning electron microscopy and found to be anisotropic fine particles of polyamide with an average particle diameter of 15 μm and particle diameter distribution index of 2.8.

Particle z7 (Particles produced from Grilamid (registered trademark) TR55 supplied by Emser Werke, Inc., used as starting material, and having an average particle diameter of 13 μm, particle diameter distribution of 2.1, sphericity of 94, and Tg of 160° C.).

First, 100 parts by mass of polyamide (Grilamid (registered trademark) TR-55, supplied by Emser Werke, Inc.) that contained 4,4'-diamino-3,3'-dimethyl dicyclohexyl methane as essential component was added to a mixed solvent consisting of 300 parts by mass of chloroform and 100 parts by mass of methanol to provide a uniform solution. Then, while the solution was stirred at 450 rpm, 185 parts by mass of an aqueous solution containing 6 mass % of polyvinyl alcohol (supplied by Kanto Chemical Co., Inc.) was dropped little by little to prepare a liquid containing particles dispersed in a dispersion medium, followed by removing the solvent to provide fine particles of polyamide. The resulting powder was observed by scanning electron microscopy and it was found to be fine particles of polyamide with an average particle diameter of 13 μm, particle diameter distribution index of 2.1, and sphericity of 94.

Particle z8 (Orgasol (registered trademark) 1002D, supplied by Arkema K.K., average particle diameter 20 μm, particle diameter distribution 1.30, sphericity 97, Tg 53° C.)

Particle z9 (particles produced from Trogamid (registered trademark) CX7323 used as raw material, and having an average particle diameter of 20 μm, particle diameter distribution index of 1.2, sphericity of 97, and Tg of 137° C.).

(Production Method for Particle z9: By Reference to International Publication WO 2009/142231)

In a 1,000 ml four-neck flask, 20 g of polyamide (weight average molecular weight 17,000, Trogamid (registered trademark) CX7323, supplied by Degussa) used as polymer A, 500 g formic acid used as an organic solvent, and 20 g of polyvinyl alcohol (PVA 1000, supplied by Wako Pure Chemical Industries, Ltd., SP value 32.8 (J/cm$^3$)$^{1/2}$) used as polymer B were heated at 80° C. and stirred to ensure dissolution of the polymers. After lowering the temperature of the system to 55° C., 500 g of ion-exchanged water, which was used as poor solvent, started to be added through a water supply pump at a rate of 0.5 g/min while maintaining an adequately stirred state and stirring the solution at 900 rpm. The dripping rate was gradually increased as the addition was continued, and the addition of the entire quantity was finished in 90 min. The solution turned to white when 100 g of ion-exchanged water had been added. When a half quantity of the ion-exchanged water had been added, the temperature of the solution was raised to 60° C., and subsequently the remaining ion-exchanged water was poured. After finishing the addition of the entire quantity, stirring was continued for additional 30 min. The resulting suspension liquid was cooled to room temperature and filtered, followed by washing with 500 g of ion-exchanged water and vacuum-drying at 80° C. for 10 hours to provide 11 g of a white solid material. The resulting powder was observed by scanning electron microscopy and found to be fine particles of polyamide with an average particle diameter of 20 μm and particle diameter distribution index of 1.2.

(1) Measurement of the Number of Peaks, Peak Particle Diameter Ratio, Half-Value Width of Peak from Larger-Diameter Particles, and Peak Height Ratio of Polymer Particles [Cx]

The particles were fed into distilled water to a concentration of about 0.1 mass %, and dispersed by ultrasonic treatment. This dispersion liquid was examined with a laser diffraction type particle size distribution measuring instrument (SALD-2100: supplied by Shimadzu Corporation) to determine the particle diameter distribution. The settings used were such that the particle diameter detection was to be performed over the range of 0.1 to 100 μm and that this range was divided into 50 sections. To prepare a particle diameter distribution chart, measurements were plotted by connecting them with straight lines in a graph where the longitudinal and the horizontal axis represented the volume-based relative particle quantity and the logarithmic particle diameter, respectively. The number of points that give maximums in this particle diameter distribution chart is hereinafter referred to as the number of peaks. In the case where the number of peaks is 2, the ratio of D1/D2 between the diameter (D1) of the particles that give the peak attributable to the larger-diameter particles and the diameter (D2) of the particles that give the peak attributable to the smaller-diameter particles was calculated as illustrated in FIG. 1 and used as the peak particle diameter ratio. Then, a horizontal line was drawn at a height equal to a half of the height of the peak attributable to the larger-diameter particles and the ratio of DL/DS between the particle diameter (DL) corresponding to the intersection of the line with the larger particle diameter part of the peak and the particle diameter (DS) corresponding to the intersection of the line with its smaller particle diameter part was calculated and used as the half-value width. In addition, the ratio of H1/H2 between the height (H1) of the peak attributable to the larger-diameter particles and the height (H2) of the peak attributable to the smaller-diameter particles was calculated and used as the peak height ratio. In the case where three or more peaks were found, the two highest peaks were selected from all peaks, and the above calculations were made for them.

(2) Measurement of Average Particle Diameter, Particle Diameter Distribution Index, and Sphericity of Polymer Particles The particle diameter of individual polymer particles was measured by observing the fine particles by scanning electron microscopy (JSM-6301NF scanning electron microscope supplied by JEOL Ltd.) at a magnification of 1,000. Here, if a particle is not perfectly circular, its major axis was measured and used as its particle diameter.

To determine the average particle diameter, 100 particles in a photograph were randomly selected and their diameters were measured, followed by calculating the arithmetic average. The average particle diameter as referred to herein is the number average particle diameter. The particle diameter distribution index, which represents the particle diameter distribution, was calculated by the following numeric conversion equations using the diameters of individual particles determined above.

$$Dn = \sum_{i=1}^{n} Ri/n \quad \text{[Formula 9]}$$

$$Dv = \sum_{i=1}^{n} Ri^4 \bigg/ \sum_{i=1}^{n} Ri^3$$

$$PDI = Dv/Dn$$

Here, Ri, n, Dn, Dv, and PDI denote the particle diameter of a particular particle, number of measurements (100), number average particle diameter, volume average particle diameter, and particle diameter distribution index, respectively.

The sphericity is determined by measuring the major and minor axes of randomly selected 30 particles in a photograph, and calculating the sphericity by the following equation from the average of the measurements.

$$\text{Sphericity} = \frac{\sum_{i=1}^{n}(\text{minor axis}/\text{major axis})}{n} \times 100 \quad [\text{Formula 10}]$$

Here, n denotes the number of measurements, which is equal to 30.

(3) Measurement of Glass Transition Temperature (Tg) of Polymer Particles [C]

Using differential scanning calorimetry (DSC), polymer particles are heated at a heating rate of 20° C./min from 30° C. to a temperature that is 30° C. or more higher than an expected glass transition temperature, maintained at the temperature for 1 min, once cooled at a cooling rate of 20° C./min down to 0° C., maintained at the temperature for 1 min, and then heated again at a heating rate of 20° C./min while observing the glass transition temperature (Tg).

Specifically, in the stepwise changing portion of a resulting DSC curve, the glass transition temperature was defined as the temperature at the point where the straight line that is at the same distance in the vertical direction from the extensions of the baselines intersects the curve that changes stepwise due to glass transition. Here, a Model 2910 differential scanning calorimeter supplied by TA Instruments was used for the measurement.

(4) Preparation of Epoxy Resin Composition

In a kneader, 10 parts by mass of Sumiepoxy (registered trademark) ELM434 as epoxy resin, 70 parts by mass of Araldite (registered trademark) MY0600, 20 parts by mass of Epiclon (registered trademark) 830, and 15 parts by mass of Sumikaexcel (registered trademark) 5003P were fed, and heated to 160° C. while kneading, and kneaded for an additional 1 hour at 160° C. to provide a transparent, viscous liquid. After cooling the liquid to 80° C. while kneading it, 40 parts by mass of 3,3'-DAS and a total of 74 parts by mass of polymer particles [C] consisting of the various polymer particles as listed in Tables 1 to 3 were added, followed by further kneading to provide an epoxy resin composition.

(5) Preparation of Prepreg

The epoxy resin composition was spread over a piece of release paper with a knife coater to prepare a resin film. Then, carbon fibers of Torayca (registered trademark) T800G-24K-31E supplied by Toray Industries, Inc. were paralleled in one direction to form a sheet, and two resin films were used to cover both sides of the carbon fiber sheet and pressed under heat to impregnate the carbon fibers with the resin to provide a unidirectional prepreg with a carbon fiber basis weight of 190 g/m² and a matrix resin mass fraction of 35.5%. In doing this, two-step impregnation was carried out to produce a prepreg in which polymer particles were extremely localized near the surfaces.

To provide a resin film for primary prepreg production, an epoxy resin composition containing no polymer particles [C] and containing the same components as described in section (4) except for polymer particles [C] was prepared by the same procedure as specified in section (4). This epoxy resin composition was spread over a piece of release paper with a knife coater to provide a resin film with a basis weight of 30 g/m², which corresponds to 60 mass % of the normal value. Then, carbon fibers of Torayca (registered trademark) T800G-24K-31E supplied by Toray Industries, Inc. were paralleled in one direction to form a sheet, and two resin films were used to cover both sides of the carbon fiber sheet and pressed under heat using heating rollers at a temperature of 100° C. and an air pressure of 1 atm to impregnate the carbon fibers with the resin to provide a primary prepreg.

In order to produce a resin film to be used for two-step impregnation, furthermore, the epoxy resin composition containing polymer particles [C] prepare in section (4) was spread over a piece of release paper with a knife coater to provide a resin film with a basis weight of 20 g/m², which corresponds to 40 mass % of the normal value. Such films were used to sandwich a primary prepreg and pressed under heat using heating rollers at a temperature of 80° C. and an air pressure of 1 atm to provide a prepreg in which polymer particles were extremely localized near the surfaces. The use of this two-step impregnation process serves to produce a prepreg in which polymer particles are extremely localized near the surfaces although as a whole the epoxy resin composition constituting the prepreg contains the same quantity of polymer particles as specified in the particle content list in Table 1.

(6) Proportion of Particles Existing in the Region with a Depth Equal to 20% of the Prepreg Thickness The unidirectional prepreg prepared in section (5) is interposed between two polytetrafluoroethylene resin plates with smooth surfaces and brought into close contact, then the temperature is increased gradually for 7 days up to 150° C. to ensure gelation and curing, thus producing a plate-like cured resin. After the completion of curing, the cured body was cut in a direction perpendicular to the contact interface, and the cross section was polished and photographed with an optical microscope at a magnification of 200 or more in such a manner that the upper and lower surfaces of the prepreg were included in the field of view. According to the same procedure, the distance between the polytetrafluoroethylene resin plates was measured at five points aligned in the lateral direction in the cross-sectional photograph, and the average (n=5) was assumed to represent the thickness of the prepreg. For each of the two surfaces of the prepreg, a line parallel to the surface of the prepreg was drawn at a depth equal to 20% of the thickness. Then, the total area of the particles existing between each surface of the prepreg and each of the lines drawn as described above and the total area of the particles existing across the entire thickness of the prepreg were determined, followed by calculating the proportion of the number of particles existing in the regions of 20% depth from the prepreg surfaces to the total number of particles existing across the entire (100%) thickness of the prepreg. Here, the total area of the fine particles was determined by cutting the particle portions out of a cross-sectional photograph and converting their mass.

(7) Preparation of Composite Material Plate for Mode I Interlaminar Toughness ($G_{IC}$) Test and Implementation of $G_{IC}$ Measurement By the following procedure from (a) to (e), composite material plates for mode I interlaminar toughness ($G_{IC}$) were test prepared according to JIS K7086 (1993).

(a) A total of 20 unidirectional prepreg plies as prepared in section (5) were laminated together with the fibers aligned in one direction. A fluorine resin film with a width of 40 mm and a thickness of 12 μm was interposed at the center of the laminate (between the 10th and the 11th ply) in such a manner that its direction was perpendicular to the fibers.

(b) The laminated prepreg plies were covered with a nylon film without leaving gaps, and cured in an autoclave under the conditions of a pressure of 0.59 MPa, a heating rate of 1.5° C./min, and 2 hours at 180° C. to form an unidirectional fiber reinforced composite material.

(c) The unidirectional fiber reinforced composite material obtained in step (b) was cut to a width of 20 mm and a length of 195 mm. Cutting was performed so that the fibers were parallel to the length direction of the specimen.

(d) According to JIS K7086 (1993), a block (aluminum, length 25 mm) for pin load application was attached to an end (where the film was located) of the specimen.

(e) White paint was applied to both side faces of the specimen to ensure easy observation of the progress of cracking.

The composite material plate prepared above was used to make $G_{IC}$ measurements by the following procedure.

Test was carried out using an Instron type universal tester (supplied by Instron Corporation) according to Appendix 1 of JIS $K_{7086}$ (1993). The crosshead speed was 0.5 mm/min before the length of the crack reached 20 mm and 1 mm/min after it reached 20 mm. According to JIS K7086 (1993), the mode I interlayer fracture toughness ($G_{IC}$ at the initial point of cracking) that corresponds to the critical load at the initial point of cracking and the mode I interlayer fracture toughness during progress of cracking were calculated from the load, displacement, and crack length. A $G_{IC}$ measurement at the initial point of cracking, additional five or more measurements made at crack lengths of 10 mm to 60 mm were, and the average of the total of six or more measurements were compared.

(8) Measurement of Compressive Strength Under Wet Heat Conditions of Fiber Reinforced Composite Material A total of 12 unidirectional prepreg plies prepared in section (5) were laminated with their fibers aligned parallel to the compression direction and cured in an autoclave under the conditions of a pressure of 0.59 MPa, a heating rate of 1.5° C./min, and 2 hours at a temperature of 180° C. to provide a laminate body. From this laminate body, a tabbed specimen with a thickness of 2 mm, width of 15 mm, and length 78 mm was prepared and immersed in warm water at 71° C. for 14 days. This specimen was subjected to 0° compressive strength measurement at 82° C. using a universal tester equipped with a temperature controlled bath according to JIS K7076 (1991). Five specimens were prepared (n=5).

(9) Measurement of Interlayer Thickness of Fiber Reinforced Composite Material

A total of 20 unidirectional prepreg plies as prepared in section (5) were laminated with their fibers aligned in one direction. The laminated prepreg plies were covered with a nylon film without leaving gaps, and molded in an autoclave under the conditions 2 hours at 180° C., a pressure of 0.59 MPa, and a heating rate of 1.5° C./min to form a laminate body. This was cut in a direction perpendicular to the carbon fibers, and the cross section was polished and photographed with an optical microscope at a magnification of 200 or more. In an appropriately-selected region between fiber layers in the photograph, a line parallel to the carbon fiber layers was drawn so that it represented a carbon fiber volume content of 50%, and it was assumed to be a boundary line between the internal region of the fiber layer and the interlayer region between the fiber layers. A boundary line averaged over a length of 100 μm was drawn, and the distance between them was assumed to represent the interlayer thickness. The same procedure was carried out for five appropriately selected interlayer regions, and the average was adopted.

Except for heating at a rate of 0.1° C./min, the same procedure as above was carried out to prepare a layered body, and then the interlayer thickness of was measured to examine the influence of the heating rate.

(10) Measurement of Sphericity of Particles [C] in Cross Section of Fiber Reinforced Composite Material A total of 20 unidirectional prepreg plies as prepared in section (5) were laminated with their fibers aligned in one direction. The laminated prepreg plies were covered with a nylon film without leaving gaps, and cured in an autoclave under the conditions of a pressure of 0.59 MPa, a heating rate of 1.5° C./min, and 2 hours at 180° C. to form a laminated material. This was cut in a direction perpendicular to the carbon fibers, and the cross section was polished and photographed with an optical microscope at a magnification of 200 or more. The major and minor axes of randomly selected 30 particles in a photograph were measured, and the sphericity was calculated by the following equation from the average of the measurements.

$$\text{Sphericity} = \frac{\sum_{i=1}^{n}(\text{minor axis}/\text{major axis})}{n} \times 100 \quad \text{[Formula 11]}$$

Example 1

An epoxy resin composition for production of fiber reinforced composite material was prepared by the procedure described in section (4) using a kneader and then the procedure described in section (5) was carried out to provide a prepreg in which particles [Cx] were extremely localized near the surfaces. Using the resulting prepreg, the measurement procedures specified in section (6) "Proportion of particles existing in the region with a depth equal to 20% of the prepreg thickness" (Proportion of surface layer particles), section (7) "Preparation of composite material plate for mode I interlaminar toughness (GIC) test and implementation of GIC measurement", (8) "Measurement of compressive strength under wet heat conditions of fiber reinforced composite material", (9) "Measurement of interlayer thickness of fiber reinforced composite material", and (10) "Measurement of sphericity of particles [Cx] in a cross section of fiber reinforced composite material" were carried out.

Results are given in Table 1.

The prepreg was found to have been impregnated appropriately and had good surface quality, and the proportion of particles existing in the 20% depth region was a high 98%, showing that polymer particles were localized near the surfaces in the prepreg. Results showed that the fiber reinforced composite material had an allowable $G_{IC}$ value and compressive strength under wet heat conditions, and the interlayer thickness was stable regardless of the molding conditions used.

Examples 2-10

Except for using polymer particles [Cx] composed as specified in Table 1, the same procedure as in Example 1 was carried out to provide a prepreg. Particles were localized adequately near the surface and the interlayer thicknesses of the fiber reinforced composite materials was smaller, suggesting that the fiber reinforced composite materials had satisfactory $G_{IC}$ values and compressive strength under wet heat conditions.

Comparative Example 1

Except that polymer particles [C] gave only one peak and did not meet the requirements for [Cx], the same procedure as in Example 1 was carried out to produce an epoxy resin composition and prepreg. As a result, the fiber reinforced composite material had a large interlayer thickness and had an inadequate $G_{IC}$ value.

Comparative Example 2

Except for using particles x9, which gave a peak half-value width of more than 3 and did not meet the requirements for [Cx1], the same procedure as in Example 1 was carried out to produce an epoxy resin composition and prepreg. As a result, the fiber reinforced composite material was insufficient in the compressive strength under wet heat conditions and the stability of the interlayer thickness to molding conditions.

Comparative Example 3

Except for using particles x3, which gave a peak particle diameter ratio of less than 1.5 and did not meet the requirements for [Cx2], the same procedure as in Example 1 was carried out to produce an epoxy resin composition and prepreg. As a result, the fiber reinforced composite material had a large interlayer thickness and had an inadequate $G_{IC}$ value.

Comparative Example 4

Except for using particles x10, which was soluble in epoxy resin and did not meet the requirements for [Cx1], the same procedure as in Example 1 was carried out to produce an epoxy resin composition and prepreg. As a result, the fiber reinforced composite material was insufficient in the $G_{IC}$ value, the compressive strength under wet heat conditions, and the stability of the interlayer thickness to molding conditions.

TABLE 1

|  |  | Example 1 | Example 2 | Example 3 | Example 4 | Example 5 | Example 6 | Example 7 | Example 8 |
|---|---|---|---|---|---|---|---|---|---|
| Polymer particles [C] | [Cx1] |  |  |  |  |  |  |  |  |
|  | particles x1 (CX25 μm) | 75 |  |  |  |  |  |  |  |
|  | particles x2 (CX18 μm) |  | 75 |  |  |  |  |  |  |
|  | particles x3 (CX13 μm) |  |  | 75 |  | 90 | 60 | 40 |  |
|  | particles x4 (CX8 μm) |  |  |  | 75 |  |  |  |  |
|  | particles x6 (1002D) |  |  |  |  |  |  |  | 85 |
|  | particles x7 (TR-55) |  |  |  |  |  |  |  |  |
|  | [Cx2] |  |  |  |  |  |  |  |  |
|  | particles x4 (CX8 μm) | 25 | 25 |  |  |  |  |  |  |
|  | particles x5 (CX4 μm) |  |  | 25 |  | 10 | 40 | 60 |  |
|  | particles x8 (SP-500) |  |  |  | 25 |  |  |  | 15 |
|  | Other than [Cx1] or [Cx2] |  |  |  |  |  |  |  |  |
|  | particles x9 (TN) |  |  |  |  |  |  |  |  |
|  | particles x3 (CX13 μm) |  |  |  |  |  |  |  |  |
|  | particles x10 (5003P) |  |  |  |  |  |  |  |  |
| Proportion of surface particles (%) |  | 98 | 97 | 96 | 97 | 97 | 95 | 93 | 96 |
| Particle diameter distribution chart |  |  |  |  |  |  |  |  |  |
| number of peaks |  | 2 | 2 | 2 | 2 | 2 | 2 | 2 | 2 |
| peak particle diameter ratio |  | 3.1 | 2.3 | 3.3 | 1.6 | 3.3 | 3.3 | 3.3 | 4.0 |
| half-value width of peak from larger-diameter particles |  | 2.5 | 2.2 | 1.8 | 2.1 | 1.8 | 1.8 | 1.8 | 2.3 |
| peak height ratio |  | 1.8 | 2.1 | 2.3 | 3.0 | 6.4 | 1.1 | 0.7 | 4.8 |
| [Cx1] |  |  |  |  |  |  |  |  |  |
| sphericity |  | 96 | 98 | 97 | 98 | 97 | 97 | 97 | 97 |
| particle diameter distribution index |  | 1.3 | 1.2 | 1.2 | 1.1 | 1.2 | 1.2 | 1.2 | 1.3 |
| average particle diameter (μm) |  | 25 | 18 | 13 | 8 | 13 | 13 | 13 | 20 |
| mass content |  | 75 | 75 | 75 | 75 | 90 | 60 | 40 | 85 |
| glass transition temperature (° C.) |  | 137 | 137 | 137 | 137 | 137 | 137 | 137 | 53 |
| [Cx2] |  |  |  |  |  |  |  |  |  |
| average particle diameter ratio (Cx2/Cx1) |  | 0.32 | 0.43 | 0.30 | 0.63 | 0.31 | 0.31 | 0.31 | 0.25 |
| Characteristics of fiber reinforced composite material |  |  |  |  |  |  |  |  |  |
| interlayer toughness GIC (J/m2) |  | 420 | 455 | 490 | 508 | 438 | 525 | 508 | 490 |
| compressive strength under wet heat conditions (MPa) |  | 1020 | 1050 | 1090 | 1010 | 1110 | 1070 | 1060 | 960 |
| interlayer thickness (μm) - heating rate 1.5° C./min |  | 36 | 33 | 28 | 27 | 31 | 33 | 32 | 29 |
| interlayer thickness (μm) - heating rate 0.1° C./min |  | 36 | 34 | 29 | 29 | 31 | 35 | 35 | 36 |
| sphericity of [C] |  | 95 | 97 | 95 | 94 | 97 | 96 | 96 | 88 |

TABLE 1-continued

|  |  | Example 9 | Example 10 | Comparative example 1 | Comparative example 2 | Comparative example 3 | Comparative example 4 |
|---|---|---|---|---|---|---|---|
| Polymer particles [C] | [Cx1] | | | | | | |
| | particles x1 (CX25 μm) | | 75 | | | | |
| | particles x2 (CX18 μm) | | | | | 75 | |
| | particles x3 (CX13 μm) | | | 100 | | | |
| | particles x4 (CX8 μm) | | | | | | |
| | particles x6 (1002D) | | | | | | |
| | particles x7 (TR-55) | 75 | | | | | |
| | [Cx2] | | | | | | |
| | particles x4 (CX8 μm) | | | | | | |
| | particles x5 (CX4 μm) | | 25 | | | | |
| | particles x8 (SP-500) | 25 | | | 25 | | 25 |
| | Other than [Cx1] or [Cx2] | | | | | | |
| | particles x9 (TN) | | | | 75 | | |
| | particles x3 (CX13 μm) | | | | | 25 | |
| | particles x10 (5003P) | | | | | | 75 |
| Proportion of surface particles (%) | | 97 | 95 | 98 | 96 | 97 | 96 |
| Particle diameter distribution chart | | | | | | | |
| number of peaks | | 2 | 2 | 1 | 2 | 2 | 2 |
| peak particle diameter ratio | | 3.6 | 6.3 | — | 2.6 | 1.4 | 3.6 |
| half-value width of peak from larger-diameter particles | | 2.7 | 2.5 | — | 3.6 | 3.3 | 1.6 |
| peak height ratio | | 2.2 | 1.7 | — | 0.7 | 3.8 | 3.3 |
| [Cx1] | | | | | | | |
| sphericity | | 85 | 96 | 97 | — | 98 | — |
| particle diameter distribution index | | 1.5 | 1.3 | 1.2 | — | 1.2 | — |
| average particle diameter (μm) | | 18 | 25 | 13 | — | 18 | — |
| mass content | | 75 | 75 | 100 | — | 75 | — |
| glass transition temperature (° C.) | | 160 | 137 | 137 | — | 137 | — |
| [Cx2] | | | | | | | |
| average particle diameter ratio (Cx2/Cx1) | | 0.28 | 0.16 | — | — | — | — |
| Characteristics of fiber reinforced composite material | | | | | | | |
| interlayer toughness GIC (J/m2) | | 508 | 430 | 403 | 473 | 385 | 368 |
| compressive strength under wet heat conditions (MPa) | | 990 | 1030 | 1100 | 980 | 1040 | 970 |
| interlayer thickness (μm) - heating rate 1.5° C./min | | 25 | 35 | 37 | 29 | 41 | 21 |
| interlayer thickness (μm) - heating rate 0.1° C./min | | 34 | 35 | 38 | 35 | 40 | 26 |
| sphericity of [C] | | 81 | 95 | 97 | 84 | 96 | 85 |

Example 11

An epoxy resin composition for production of fiber reinforced composite material was prepared by the procedure described in section (4) using a kneader and then the procedure described in section (5) was carried out to provide a prepreg in which particles [C] were extremely localized near the surfaces. Using the resulting prepreg, the measurement procedures specified in section (6) "Proportion of particles existing in the region with a depth equal to 20% of the prepreg thickness" (Proportion of surface layer particles), section (7) "Preparation of composite material plate for mode I interlaminar toughness (GIC) test and implementation of GIC measurement", and (8) "Measurement of compressive strength under wet heat conditions of fiber reinforced composite material" were carried out.

Results are given in Table 2.

TABLE 2

|  |  | Example 11 | Example 12 | Example 13 | Example 14 | Example 15 | Example 16 | Example 17 | Example 18 | Example 19 |
|---|---|---|---|---|---|---|---|---|---|---|
| Polymer particles [C] | particles y1 (CX7323 20 μm) | | | | | | | | | |
| | particles y2 (CX7323 18 μm) | 100 | | | | | | | 50 | |
| | particles y3 (CX7323 15 μm) | | 100 | | | | | | | |
| | particles y4 (CX7323 12 μm) | | | 100 | | | | | | 25 |
| | particles y5 (CX7323 8 μm) | | | | 100 | | | | 50 | 50 |
| | particles y6 (CX7323 4 μm) | | | | | 100 | | | | 25 |
| | particles y7 (TR90 10 μm) | | | | | | 100 | | | |
| | particles y8 (PC 10 μm) | | | | | | | 100 | | |
| | particles y9 (CX7323 12 μm) | | | | | | | | | |
| | particles y10 (TR55 13 μm) | | | | | | | | | |
| | particles y11 (SP500) | | | | | | | | | |
| | particles y12 (PEI 0.7 μm) | | | | | | | | | |

TABLE 2-continued

| Characteristics of polymer particles | | | | | | | | | |
|---|---|---|---|---|---|---|---|---|---|
| sphericity | 98 | 97 | 96 | 98 | 97 | 96 | 91 | 98 | 97 |
| average particle diameter (μm) | 18 | 15 | 12 | 8 | 4 | 10 | 10 | 12 | 8 |
| glass transition temperature (° C.) *1 | 137 | 137 | 137 | 137 | 137 | 152 | 145 | 137 | 137 |
| particle diameter distribution index | 1.3 | 1.2 | 1.2 | 1.1 | 2.5 | 1.5 | 1.1 | 1.6 | 1.8 |
| Characteristics of prepreg | | | | | | | | | |
| Proportion of surface particles (%) | 98 | 98 | 97 | 96 | 93 | 95 | 96 | 95 | 95 |
| Characteristics of fiber reinforced composite material | | | | | | | | | |
| interlayer toughness $G_{IC}$ (J/m$^2$) | 410 | 425 | 435 | 455 | 490 | 525 | 405 | 420 | 475 |
| compressive strength under wet heat conditions (MPa) | 1070 | 1070 | 1090 | 1070 | 1060 | 1030 | 1100 | 1080 | 1070 |

| | | Example 20 | Example 21 | Comparative example 5 | Comparative example 6 | Comparative example 7 | Comparative example 8 | Comparative example 9 |
|---|---|---|---|---|---|---|---|---|
| Polymer particles [C] | particles y1 (CX7323 20 μm) | | | 100 | | | | |
| | particles y2 (CX7323 18 μm) | | 30 | | | | | |
| | particles y3 (CX7323 15 μm) | | | | | | | |
| | particles y4 (CX7323 12 μm) | 50 | | | | | | |
| | particles y5 (CX7323 8 μm) | | | | | | | |
| | particles y6 (CX7323 4 μm) | 50 | 70 | | | | | |
| | particles y7 (TR90 10 μm) | | | | | | | |
| | particles y8 (PC 10 μm) | | | | | | | |
| | particles y9 (CX7323 12 μm) | | | | 100 | | | |
| | particles y10 (TR55 13 μm) | | | | | 100 | 50 | |
| | particles y11 (SP500) | | | | | | 50 | |
| | particles y12 (PEI 0.7 μm) | | | | | | | 100 |
| Characteristics of polymer particles | | | | | | | | |
| sphericity | | 97 | 97 | 97 | 72* | 94 | 91 | 96 |
| average particle diameter (μm) | | 8 | 8 | 20* | 12 | 13 | 9 | 0.7* |
| glass transition temperature (° C.) *1 | | 137 | 137 | 137 | 137 | 160* | 41* | 217* |
| particle diameter distribution index | | 2.7 | 4.6 | 1.2 | 2.6 | 2.1 | 7 | 1.1 |
| Characteristics of prepreg | | | | | | | | |
| Proportion of surface particles (%) | | 94 | 94 | 96 | 91 | 96 | 93 | 95 |
| Characteristics of fiber reinforced composite material | | | | | | | | |
| interlayer toughness $G_{IC}$ (J/m$^2$) | | 545 | 495 | 375 | 350 | 440 | 475 | 315 |
| compressive strength under wet heat conditions (MPa) | | 1060 | 1030 | 1080 | 1040 | 980 | 940 | 990 |

*Not meeting requirements for polymer particles [Cy]
*1) For particles with the lowest glass transition temperature in cases where a plurality of polymer particles are combined.

The prepreg was found to have been impregnated appropriately and had good surface quality, and the proportion of particles existing in the 20% depth region was a high 98%, showing that polymer particles were localized near the surfaces in the prepreg. As a result, the fiber reinforced composite material had an allowable $G_{IC}$ value and a high compressive strength under wet heat conditions.

Examples 12 to 15

Except for using polymer particles [C] having a smaller average particle diameter, the same procedure as in Example 11 was carried out to produce a prepreg. The fiber reinforced composite material had an improved $G_{IC}$ value and maintained a high compressive strength under wet heat conditions.

Examples 16 and 17

Except for using polymer particles [C] of a different material, the same procedure as in Example 11 was carried out to produce a prepreg. Both the $G_{IC}$ value and compressive strength under wet heat conditions were at an allowable level.

Examples 18 to 21

Except for using polymer particles [C] having a larger particle diameter distribution index, the same procedure as in Example 11 was carried out to produce a prepreg. Increasing the particle diameter distribution index in a region where the average particle diameter is small served to provide a fiber reinforced composite material having a largely improved $G_{IC}$ value and maintaining a high compressive strength under wet heat conditions.

Comparative Example 5

Except for using polymer particles [C] having an average particle diameter 20 pin, the same procedure as in Example 11 was carried out to produce a prepreg. The resulting fiber reinforced composite material had a largely decreased $G_{IC}$ value and did not serve sufficiently.

Comparative Example 6

Except for using polymer particles [C] having a low sphericity of 72%, the same procedure as in Example 11 was carried out to produce a prepreg. The resulting fiber reinforced composite material had a largely decreased $G_{IC}$ value and did not serve sufficiently.

Comparative Example 7

Except for using polymer particles [C] having a high glass transition temperature of 160° C., the same procedure as in Example 11 was carried out to produce a prepreg. The resulting fiber reinforced composite material had a largely $G_{IC}$ value and failed have a sufficient compressive strength under wet heat conditions.

Comparative Example 8

Except that polymer particles [C] additionally contained particles of nylon 12 having a low glass transition temperature of 41° C., the same procedure as in Comparative example 7 was carried out to produce a prepreg. The resulting fiber reinforced composite material had a slightly improved $G_{IC}$ value but had a further decreased compressive strength under wet heat conditions.

Comparative Example 9

Except that particles of polyetherimide having an average particle diameter of 0.7 µm were used as polymer particles [C], the same procedure as in Example 11 was carried out to produce a prepreg. The resulting fiber reinforced composite material was poor in both the $G_{IC}$ value and compressive strength under wet heat conditions.

Example 22

An epoxy resin composition for production of fiber reinforced composite material was prepared by the procedure described in section (4) using a kneader and then the procedure described in section (5) was carried out to provide a prepreg in which particles [C] were extremely localized near the surfaces. Using the resulting prepreg, the measurement procedures specified in section (6) "Proportion of particles existing in the region with a depth equal to 20% of the prepreg thickness" (Proportion of surface layer particles), section (7) "Preparation of composite material plate for mode II interlaminar toughness (GIC) test and implementation of $G_{IIC}$ measurement", (8) "Measurement of compressive strength under wet heat conditions of fiber reinforced composite material", and (9) Measurement of interlayer thickness and particle sphericity in fiber reinforced composite material were carried out.

Results are given in Table 3.

TABLE 3

| | | Example 22 | Example 23 | Example 24 | Example 25 | Example 26 | Example 27 | Example 28 | Comparative example 10 | Comparative example 11 | Comparative example 12 | Comparative example 13 |
|---|---|---|---|---|---|---|---|---|---|---|---|---|
| Polymer particles [C] | particles z1 (CX7323 25 µm) | 100 | | | | 25 | 50 | | | | | |
| | particles z2 (CX7323 18 µm) | | 100 | | | 50 | | | | | | |
| | particles z3 (CX7323 13 µm) | | | 100 | | | | | | | | |
| | particles z4 (CX7323 8 µm) | | | | | 25 | 50 | | 100 | | | |
| | particles z5 (TR90 46 µm) | | | | 100 | | | | | | | |
| | particles z6 (CX7323 15 µm) | | | | | | | | | 100 | | |
| | particles z7 (TR55 13 µm) | | | | | | | | | | 100 | |
| | particles z8 (1002D 20 µm) | | | | | | | | | | | 100 |
| | particles z9 (CX7323 20 µm) | | | | | | | 100 | | | | |
| Characteristics of polymer particles | | | | | | | | | | | | |
| sphericity | | 96 | 98 | 97 | 93 | 97 | 97 | 97 | 98 | 75* | 94 | 97 |
| average particle diameter (µm) | | 25 | 18 | 13 | 46 | 17 | 16 | 20 | 8* | 15 | 13 | 20 |
| glass transition temperature (° C.) | | 137 | 137 | 137 | 152 | 137 | 137 | 137 | 137 | 137 | 160* | 53* |
| particle diameter distribution index | | 1.3 | 1.2 | 1.2 | 2.7 | 1.6 | 1.9 | 1.2 | 1.1 | 2.8 | 2.1 | 1.3 |

TABLE 3-continued

|  | Example 22 | Example 23 | Example 24 | Example 25 | Example 26 | Example 27 | Example 28 | Comparative example 10 | Comparative example 11 | Comparative example 12 | Comparative example 13 |
|---|---|---|---|---|---|---|---|---|---|---|---|
| Characteristics of prepreg |  |  |  |  |  |  |  |  |  |  |  |
| Proportion of surface particles (%) | 97 | 96 | 93 | 95 | 96 | 95 | 95 | 96 | 91 | 96 | 93 |
| Characteristics of fiber reinforced composite material |  |  |  |  |  |  |  |  |  |  |  |
| interlayer thickness (μm) | 41 | 36 | 31 | 52 | 34 | 33 | 38 | 28 | 30 | 27 | 24 |
| sphericity of particles [C] | 96 | 97 | 96 | 90 | 96 | 95 | 96 | 97 | 77 | 88 | 78 |
| interlayer toughness $G_{IIC}$ (J/m2) | 4140 | 3870 | 3610 | 3750 | 3590 | 3420 | 4060 | 2880 | 2600 | 2830 | 3120 |
| compressive strength under wet heat conditions (MPa) | 1090 | 1080 | 1080 | 1040 | 1060 | 1050 | 1110 | 1030 | 1040 | 980 | 910 |

*Not meeting requirements for polymer particles [Cz]

The prepreg was found to have been impregnated appropriately and had good surface quality, and the proportion of particles existing in the 20% depth region was a high 97%, showing that polymer particles were localized near the surfaces in the prepreg. As a result, the resulting fiber reinforced composite material had a very high $G_{IIC}$ value and also had a high compressive strength under wet heat conditions.

Examples 23 and 24

Except for using polymer particles [C] having a smaller average particle diameter, the same procedure as in Example 22 was carried out to produce a prepreg. The resulting fiber reinforced composite material had a decreased interlayer thickness and accordingly had a decreased $G_{IIC}$ value decrease, though it was still at a sufficient level. It also maintained a high compressive strength under wet heat conditions.

Example 25

Except that particles of polyamide having a large average particle diameter of 46 μm were used as polymer particles [C], the same procedure as in Example 22 was carried out to produce a prepreg. Both the $G_{IIC}$ value and compressive strength under wet heat conditions were at an allowable level.

Examples 26 and 27

Except for using polymer particles [C] having a larger particle diameter distribution index, the same procedure as in Example 22 was carried out to produce a prepreg. As a result of a large particle diameter distribution index, the resulting fiber reinforced composite material had a decreased interlayer thickness and accordingly had a decreased $G_{IIC}$ value, though it was still at an allowable level. It also maintained a high compressive strength under wet heat conditions.

Example 28

Except for using polymer particles [C] having a smaller average particle diameter, the same procedure as in Example 22 was carried out to produce a prepreg. The resulting fiber reinforced composite material had a slightly decreased interlayer thickness and accordingly had a slightly decreased $G_{IIC}$ value decrease, though it was still at a sufficient level. It also maintained an adequately high compressive strength under wet heat conditions.

Comparative Example 10

Except for using polymer particles [C] having an average particle diameter 8 μm, the same procedure as in Example 22 was carried out to produce a prepreg. The resulting fiber reinforced composite material had a largely decreased $G_{IIC}$ value and did not serve sufficiently.

Comparative Example 11

Except for using polymer particles [C] having a low sphericity of 75%, the same procedure as in Example 22 was carried out to produce a prepreg. The resulting fiber reinforced composite material had a largely decreased $G_{IIC}$ value and did not serve sufficiently.

Comparative Example 12

Except for using polymer particles [C] having a high glass transition temperature of 160° C., the same procedure as in Example 22 was carried out to produce a prepreg. The resulting fiber reinforced composite material had an insufficient $G_{IIC}$ value.

Comparative Example 13

Except for using polymer particles [C] having a low glass transition temperature of 53° C., the same procedure as in Example 22 was carried out to produce a prepreg. The compressive strength under wet heat conditions was at an insufficient level.

INDUSTRIAL APPLICABILITY

According to the present invention, it is possible to provide fiber reinforced composite materials having a high interlaminar toughness and high compression strength under wet heat conditions regardless of the molding conditions used, and they can serve effectively for production of structural members. Their preferred applications in the aerospace industry include, for instance, primary structural members of aircraft such as main wing, tail unit, and floor beam; secondary structural members such as flap, aileron, cowl, fairing, and other interior materials, and structural members of artificial satellites such as rocket motor case. Their preferred applications for general industrial uses include structural members of vehicles such as automobile, ship, and railroad vehicle; and civil engineering and construction materials such as drive shaft, plate spring, windmill blade, various turbines, pressure vessel, flywheel, roller for paper manufacture, roofing material, cable, reinforcing bar, and mending/reinforcing materials. Applications in the sporting goods industry include golf shaft, fishing pole, rackets for tennis, badminton, squash, etc., hockey stick, and skiing pole.

The invention claimed is:

1. A prepreg comprising at least constituents [A], [B], and [C] as specified below and reinforcement fiber, wherein 90% or more of constituent [C] exists in the depth range accounting for 20% of the prepreg thickness from the prepreg surface:
   [A] epoxy resin,
   [B] epoxy resin curing agent, and
   [C] polymer particles insoluble in epoxy resin and falling under the following [Cx]:
   [Cx] polymer particles insoluble in epoxy resin and giving a particle diameter distribution chart meeting the following requirements from (x-i) to (x-iii):
      (x-i) the chart has at least two peaks,
      (x-ii) the particles giving the two highest peaks have a diameter ratio in the range of 1.5 to 7, and
      (x-iii) the one of the two highest peaks attributable to the larger-diameter particles has a half-value width in the range of 1.1 to 2.5,
   wherein a mass content of particles [Cx1] in particles [Cx] is in the range of 60 to 85 mass %, and
   wherein particles [Cx1] is polyamide particles containing a chemical structure as represented by general formula (I):

[Chemical formula 1]

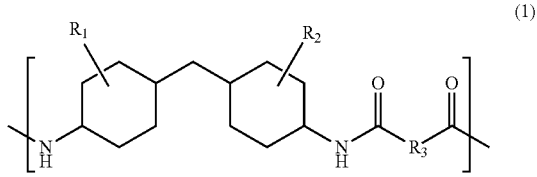

wherein, $R_1$ and $R_2$ represent a hydrogen atom, an alkyl group containing 1 to 8 carbon atoms, or a halogen atom; $R_1$ and $R_2$ are either identical to or different from each other; and $R_3$ represents a methylene group containing 1 to 20 carbon atoms.

2. A prepreg as claimed in claim 1, wherein polymer particles [Cx] are insoluble in epoxy resin and further meet the following requirement of (x-iv):
   (x-iv) the one of the two highest peaks attributable to the larger-diameter particles and the other attributable to the smaller-diameter particles have a height ratio in the range of 0.6 to 7.

3. A prepreg as claimed in claim 2, wherein particles [Cx] include particles [Cx1] and particles [Cx2] as described below:
   [Cx1] polymer particles insoluble in epoxy resin and having a sphericity in the range of 90 to 100 and a particle diameter distribution index in the range of 1.0 to 1.8, and
   [Cx2] polymer particles insoluble in epoxy resin and having an average particle diameter in the range of 1/10 to 2/3 of that of polymer particles [Cx1].

4. A prepreg as claimed in claim 1, wherein particles [Cx] include particles [Cx1] and particles [Cx2] as described below:
   [Cx1] polymer particles insoluble in epoxy resin and having a sphericity in the range of 90 to 100 and a particle diameter distribution index in the range of 1.0 to 1.8, and
   [Cx2] polymer particles insoluble in epoxy resin and having an average particle diameter in the range of 1/10 to 2/3 of that of polymer particles [Cx1].

5. A prepreg as claimed in claim 4, wherein particles [Cx1] are polymer particles having a glass transition temperature in the range of 80 to 180° C.

6. A prepreg as claimed in claim 4, wherein the average particle diameter of particles [Cx1] is in the range of 5 to 30 µm.

7. A prepreg as claimed in claim 1, wherein constituent [A] comprises a polyfunctional amine type epoxy resin.

8. A prepreg as claimed in claim 1, wherein constituent [B] is an aromatic polyamine.

9. A prepreg as claimed in claim 8, wherein constituent [B] is diaminodiphenyl sulfone, a derivative thereof, or an isomer thereof.

10. Fiber reinforced composite material produced by curing a prepreg as claimed in claim 1.

11. Fiber reinforced composite material as claimed in claim 10, wherein the reinforcement fiber is carbon fiber.

12. Fiber reinforced composite material as claimed in claim 10, wherein particles [Cx] has a sphericity in the range of 90 to 100 as determined from observation of a cross section of the fiber reinforced composite material by optical microscopy.

* * * * *